United States Patent
Elisha et al.

(10) Patent No.: US 8,195,621 B2
(45) Date of Patent: Jun. 5, 2012

(54) DATABASE SCHEMA MANAGEMENT SYSTEM

(76) Inventors: Moshe Elisha, Rehovot (IL); Jonathan Eilon, Moshav Netiv Haasara (IL); Sharon Peled, Lapid (IL)

(*) Notice: Subject to any disclaimer, the term of this patent is extended or adjusted under 35 U.S.C. 154(b) by 418 days.

(21) Appl. No.: 12/270,869

(22) Filed: Nov. 14, 2008

(65) Prior Publication Data
US 2009/0150396 A1    Jun. 11, 2009

Related U.S. Application Data

(66) Substitute for application No. 60/987,922, filed on Nov. 14, 2007.

(51) Int. Cl.
G06F 17/30    (2006.01)
(52) U.S. Cl. ............. 707/674; 707/999.008; 707/626; 707/678
(58) Field of Classification Search ........... 707/999.008, 707/626, 674, 678
See application file for complete search history.

(56) References Cited

U.S. PATENT DOCUMENTS 7,739,290 B2 * 6/2010 Rossmann .............. 707/755
7,840,530 B2 * 11/2010 Magruder et al. .......... 707/609

* cited by examiner

*Primary Examiner* — Etienne Leroux
*Assistant Examiner* — Monica Pyo

(57) ABSTRACT

Methods, systems and program storage devices for managing schema changes made by a user to an object in a database. The method including: (a) intercepting a database command entered by said user; (b) if said database command is a schema change command referencing said object in said database and a registry criterion is met, then inserting said database command or a command derived therefrom into a registered storage, otherwise releasing said database command to said database for execution thereby; (c) releasing said database command or a command derived therefrom from said registered storage to said database for execution thereby when a release criterion is met thus giving rise to a released command; and (d) inserting said released command or a command derived therefrom into a history storage.

25 Claims, 22 Drawing Sheets

Fig 13

Object: MY_TEMP
　Registered ddls:
　　Entry: ← 1802
　　　FULL DDL: DROP TABLE MY_TEMP; ← 1806
　　　DDL: DROP TABLE MY_TEMP;
　　　User: Moshe
　　　Time: 12/05/2007 ← 1808
　　　Task: Cleaning old objects
　　　Comment: Cleaning 'old objects to make the DB neat ← 1810
　History:
　　Entry:
　　　Full DDL: CREATE MY_TEMP....
　　　User DDL: create MY_TEMP....
　　　XML DDL: <xml>....
　　　User: Sharon
　　　Time: 10/02/2007
　　　Task:
　　　Comment: Creating for test. Del me later.
　...

Object: OLD_SEQ
　Registered ddls:
　　Entry:
　　　FULL DDL: DROP SEQUENCE OLD_SEQ;
　　　DDL: DROP SEQUENCE OLD_SEQ;
　　　User: Moshe
　　　Time: 12/05/2007
　　　Task: Cleaning old objects
　　　Comment: Cleaning 'old objects to make the DB neat
　History:
　　　<None>
　...

Object: UNKNOWN_SEQ
　Registered ddls:
　　Entry:
　　　FULL DDL: DROP SEQUENCE UNKNOWN_SEQ;
　　　DDL: DROP SEQUENCE UNKNOWN_SEQ;
　　　User: Moshe
　　　Time: 12/05/2007
　　　Task: Cleaning old objects
　　　Comment: Cleaning 'old objects to make the DB neat
　　　　Not sure that the seq is unnecessary.
　History:
　　　<None>
　...

```
Object: MY_TEMP
    Registered ddls:    <None>
    History:
        Entry:          FULL DDL: DROP TABLE MY_TEMP;
                        User DDL: DROP TABLE MY_TEMP;
                        XML DDL: <xml>...
                        User: Moshe
                        Time: 12/05/2007
                        Task: Cleaning old objects
                        Comment: Cleaning 'old objects to make the DB neat Entry:          Full DDL: CREATE MY_TEMP...
                        User DDL: create MY_TEMP...
                        XML DDL: <xml>...
                        User: Sharon
                        Time: 10/02/2007
                        Task:
                        Comment: Creating for test. Del me later.

Object: OLD_SEQ
    Registered ddls:
        Entry:          FULL DDL: DROP SEQUENCE OLD_SEQ;
                        DDL: DROP SEQUENCE OLD_SEQ;
                        User: Moshe
                        Time: 12/05/2007
                        Task: Cleaning old objects
                        Comment: Cleaning 'old objects to make the DB neat History:        <None>
        :

Object: UNKNOWN_SEQ
    Registered ddls:
        Entry:          FULL DDL: DROP SEQUENCE UNKNOWN_SEQ;
                        DDL: DROP SEQUENCE UNKNOWN_SEQ;
                        User: Moshe
                        Time: 12/05/2007
                        Task: Cleaning old objects
                        Comment: Cleaning 'old objects to make the DB neat
                        Not sure that the seq is unnecessary.

History:        <None>
        :
```

1900 — Object: MY_TEMP
1902 — Entry

Fig 19

DATABASE SCHEMA MANAGEMENT SYSTEM

CROSS REFERENCE TO RELATED APPLICATIONS

This application claims the benefit under 35 USC 119(e) from U.S. provisional application 60/987,922 filed Nov. 14, 2007, the disclosure of which is included herein by reference.

FIELD OF THE INVENTION

This invention relates generally to tools used in the development of computer software and more particularly to the management of database schemas.

BACKGROUND OF THE INVENTION AND PRIOR ART

Most organizations today use databases for storing and retrieving data. Each database contains vast amounts of objects (tables, stored procedures etc.) that require constant maintenance, structural changes and data updates, from the very moment the database is created, and throughout the system's life cycle.

Unless defined otherwise, all technical and scientific terms used herein have the same meaning as commonly understood by one of ordinary skill in the art to which this invention belongs. Generally, although not necessarily, the nomenclature used herein is well known and commonly employed in the art. Accordingly, the following definitions are provided for clarity of understanding only and are by no means binding. Data Manipulation Language (DML) is a family of computer languages used by computer programs or database users to retrieve, insert, delete and update data in a database. A popular data manipulation language is that of SQL, which uses DML commands to retrieve and manipulate data in a Relational database.

Data Definition Language (DDL) is a computer language for defining data structures (using DDL commands). For example, a subset of SQL's instructions forms a DDL. These SQL statements ("commands") define the structure of a database (also termed "database schema"), and more specifically the structure of database objects ("schema objects") including rows, columns, tables, the fields in each table, and the relationships between fields and tables, indexes, and database specifics such as file locations. Schemas are generally stored in a data dictionary.

Although a schema is defined in text database language, the term is often used to refer to a graphical depiction of the database structure.

The following is a list of related art:

U.S. Pat. No. 5,897,642 entitled "Method and system for integrating an object-based application with a version control system" discloses a method and system for integrating an object-based application with a version control system. Selected objects of an application such as a database are converted to individual text files and written to a temporary folder. The individual text files are then exported from the temporary folder to a version control system, whereby the version control system manages the files for developers and other developers according to its capabilities. Developers can check in individual objects for revising, whereby the text file corresponding to the checked-in object is exported by the version control system to a temporary folder and the data therein converted back into data in the object. An application program interface is provided to facilitate communication between application programs and the version control program for importing and exporting the text files and exchanging other related information.

US2005/0234934 entitled "System and method for controlling the release of updates to a database configuration" discloses a program product to perform a method for updating database objects in database servers. The program product causes the computer system to perform steps of receive user specified database schema files for release to a list of corresponding database servers where modifications are to occur, wherein each schema file includes proposed database object structures, and verify that the schema files contain valid DDL commands. The computer system verifies that the user has proper permission to modify the database object structures, and compares existing database object structures to the proposed database object structures to determine if the existing database object structures need to be modified. If the existing database object structures need to be modified, then the computer system modifies the existing database object structures, creates release notes that include documentation related to modifications of the database object structures, and sends the release notes to predefined addresses.

SUMMARY OF THE INVENTION

The invention illustrates a method of managing schema changes made by a user to an object in a database, the method comprising:
  a) intercepting a database command entered by said user;
  b) if said database command is a schema change command referencing said object in said database and a registry criterion is met, then inserting said database command or a command derived therefrom into a registered storage, otherwise releasing said database command to said database for execution thereby;
  c) releasing said database command or a command derived therefrom from said registered storage to said database for execution thereby when a release criterion is met thus giving rise to a released command; and
  d) inserting said released command or a command derived therefrom into a history storage.

There is further illustrated a method of managing schema changes made by a user to an object in a database, the method comprising:
  a) intercepting a database command entered by said user;
  b) releasing said database command or a command derived therefrom to said database for execution, thereby giving rise to a released command;
  c) if said database command is a schema change command and a registry criterion is met, then inserting said released command or a command derived therefrom into a history storage.

There is still further illustrated a system for managing schema changes made by a user to an object in a database, the system comprising:
  a processor and associated storage, said processor and associated storage are configured to perform at least the following:
  a) intercept a database command entered by said user;
  b) if said database command is a schema change command and a registry criterion is met, then insert said database command or a command derived therefrom into a registered storage, otherwise release said database command to said database;
  c) release said database command or a command derived therefrom from said registered storage to said database for execution thereby when a release criterion is met, thus giving rise to a released command; and d) insert said released command or a command derived therefrom into a history storage.

Still further, there is illustrated a system for managing schema changes made by a user to an object in a database, the system comprising:

a processor and associated storage, said processor and associated storage are configured to perform at least the following:

a) intercept a database command entered by said user;

b) release said database command or a command derived therefrom to said database for execution thereby thus giving rise to a released command;

c) if said database command is a schema change command and a registry criterion is met, then insert said released command or a command derived therefrom into a history storage.

Even further, there is illustrated a program storage device readable by machine, tangibly embodying a program of instructions executable by the machine to perform method operations for managing schema changes made by a user to an object in a database comprising:

a) intercepting a database command entered by said user;

b) if said database command is a schema change command and a registry criterion is met, then inserting said database command or a command derived therefrom into a registered storage, otherwise releasing said database command to said database;

c) releasing said database command or a command derived therefrom from said registered storage to said database for execution thereby when a release criterion is met thus giving rise to a released command; and d) inserting said released command or a command derived therefrom into a history storage.

Still further, there is illustrated a program storage device readable by a machine, tangibly embodying a program of instructions executable by the machine to perform method operations for managing schema changes made by a user to an object in a database comprising:

a) intercepting a database command entered by said user;

b) releasing said database command or a command derived therefrom to said database for execution, thereby thus giving rise to a released command;

c) if said database command is a schema change command and a registry criterion is met, then inserting said released command or a command derived therefrom into a history storage.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 13 illustrates a conflict scenario according to certain embodiments of the present invention.

FIG. 18 is another illustration of a repository in accordance with certain embodiments of the present invention.

FIG. 19 is another illustration of a repository in accordance with certain embodiments of the present invention.

DETAILED DESCRIPTION OF THE PREFERRED EMBODIMENTS

Figure 1:
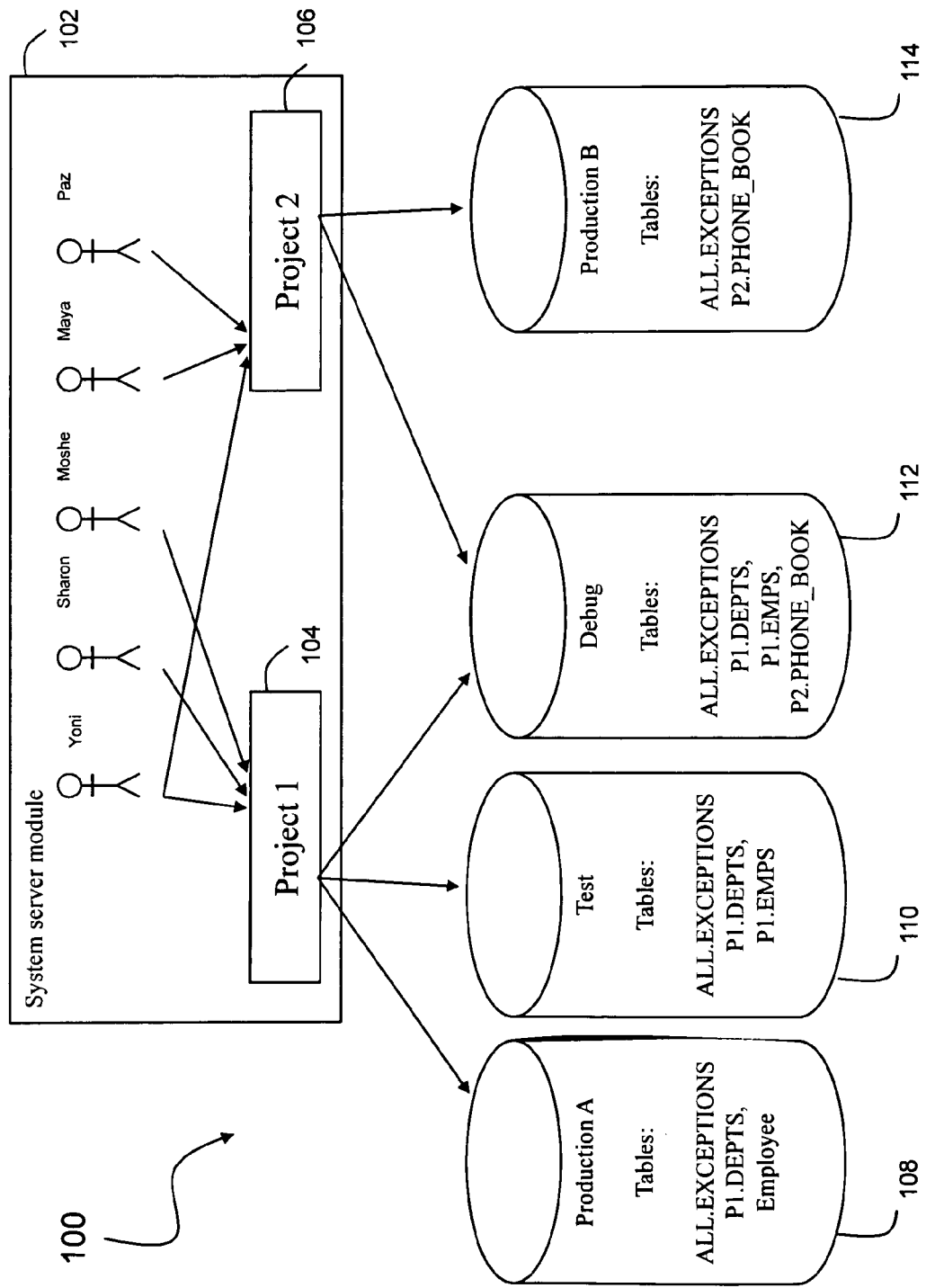
FIG. 1 illustrates a typical database set up for a company.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The methods and examples provided herein are illustrative only and not intended to be limiting.

As used herein, the phrase "for example," "such as" and variants thereof describing different implementations of the present invention, are illustrative in nature and not limiting.

FIG. 1 illustrates a typical database set up for a company.

System server module 102 manages two development projects 104 and 106, five users (Yoni, Sharon, Moshe, Paz and Maya) and four database environments (production A 108, Test 110, Debug 112 and production B 114). Each project represents software systems that include users, Privileges database environments, and history for database objects which are gathered for the purpose of management of database changes. In accordance with certain embodiments, the system server module 102 allows to perform actions such as rollback and deployment (discussed later) on entire projects rather than single database objects.

The users who work on project 104 are Yoni, Sharon and Moshe. The users who work on project 106 are Yoni, Maya and Paz.

Project 104 involves three databases which run in three environments: production DB 108, test DB 110 and debug DB 112.

Project 106 involves two databases which run in two environments: the debug DB 112 used also by project 104 and a second database 114 which runs in a second production environment.

Figure 2:
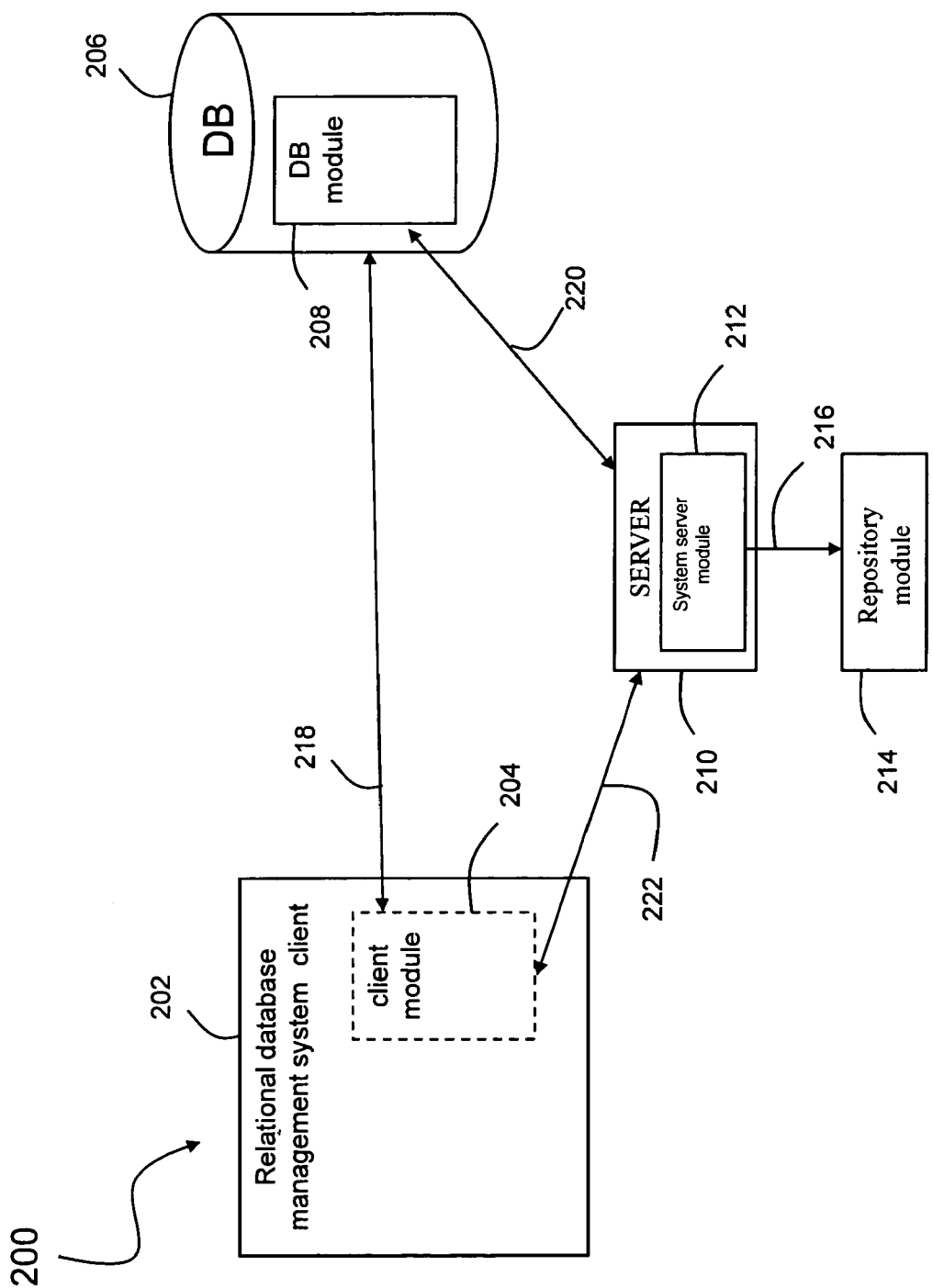
FIG. 2 is an infrastructure block diagram according to certain embodiments of the present invention.

FIG. 2 is an infrastructure block diagram according to certain embodiments of the present invention. Database system 200 may include numerous relational database management system (DBMS) clients such as DBMS client 202 whose functionality includes inputting database commands, comparing object versions, viewing object history, performing rollback etc.

For ease of explanation, DBMS client 202 will be referred to in the single form here and below, but the reference should be understood to include both the cases of single and plural DBMS clients 202 in system 200, as appropriate.

In certain embodiments of the present invention, DBMS client 202 is an application already in use prior to the deployment of the system of the present invention. For example, a third party SQL development tool (e.g. SQL plus, Toad or SQL-Navigator). In this case, the new functionalities offered by the system according to certain embodiments, such as the commit command option (explained in detail later) are implemented by a client module 204 incorporated as a plug-in in the DBMS client 202.

According to certain other embodiments, new functionalities offered by the system of the present invention are implemented at least partially using a stand-alone executable application.

According to certain other embodiments, new functionalities offered by the system of the present invention involve, at least partially, textual input (commands) entered by the user and textual output presented to the user, using the original DBMS client 202. In this case, no modification to the DBMS client 202 is required but rather a database module 208 is configured to interpret those textual commands, perform the corresponding task in the database 206 and present the user with textual output.

According to certain other embodiments, DBMS client 202 is a proprietary software product.

In certain embodiments, DBMS client 202 communicates with a database 206 (DB) using network 218. DB 206 includes an add-on DB module 208. For ease of explanation, DB 206 will be referred to in the single form here and below, but the reference should be understood to include both the cases of single and plural DB 206 in system 200, as appropriate.

In certain embodiments, DB module 208 intercepts commands sent from the DBMS client 202, and its functionality includes performing a preliminary command analysis to determine (among other things) if the command is a database schema change command (i.e. a command that causes changes to a database schema), directing the command to System server module 212, releasing the command to the database for execution thereby and more as will be explained.

In accordance with certain embodiments of the present invention, System server module 212 runs on a server 210 and DB module 208 communicates with the System server module 212 over a network 220.

System server module 212 communicates with the DB module 208. The functionality of System server module 212 includes receiving data indicative of commands sent by users to the database, as well as additional data from DB 206, analyzing the data and updating a repository module 214.

In certain embodiments, the repository module 214 stores data including data indicative of the schema changes made to database objects of the DB 206, such as the commands changing the objects, time and date of the changes, the user responsible for the change and more.

In certain embodiments, repository module 214 communicates with System server module 212 using network 216.

In accordance with certain embodiments of the present invention, the client module 204 communicates with the System server module 212 using network 222.

Each module of system 200 can be made up of any combination of software, hardware and/or firmware that performs the functions as defined and explained herein.

The modules of system 200 may be centralized in one location or dispersed over more than one location. For example in one embodiment, the functionality of one or more modules in system 200 is located in the same enclosure, for example on one server. As another example, in one embodiment, one or more modules of system 200 are connected by a local area network LAN or any other appropriate network.

Figure 3:
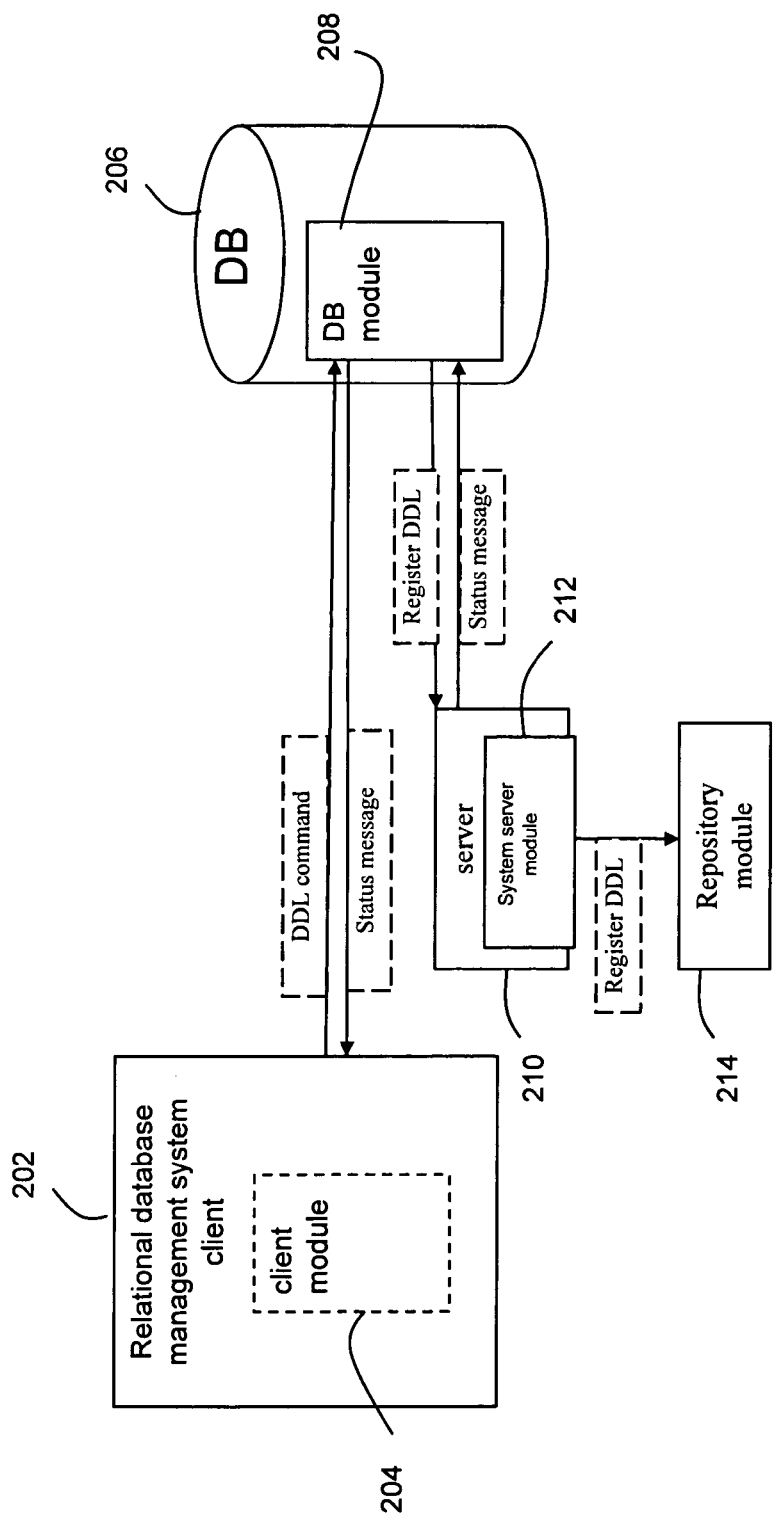
FIG. 3 illustrates a DDL command insertion scenario according to certain embodiments of the present invention.

FIG. 3 illustrates a DDL command insertion scenario according to certain embodiments of the present invention.

A user enters a DDL command using the DBMS client 202. The command is sent to the DB 206 and intercepted by DB module 208. DB module 208 analyzes the command to determine if it is a database schema change command and in case it is, sends a corresponding "register DDL" command message to the System server Application module 212. The "register DDL" command message includes data derived from the entered DDL command as well as other data such as an additional remark added by the user, the time the command was entered etc. According to certain embodiments, system server Application module 212 analyzes the details of the DDL command, tests the command against a condition termed "registry criterion" as explained in detail below and in case the criterion is met, registers the corresponding data (e.g. the time, date, user ID, corresponding database object, user's remarks, name of the task, etc.) at the repository. In certain embodiments, a DDL registration acknowledgment is sent from the System server module 212 to the DB module 208 which forwards a status message to the DBMS client 202, indicating the command was registered successfully.

Figure 4:
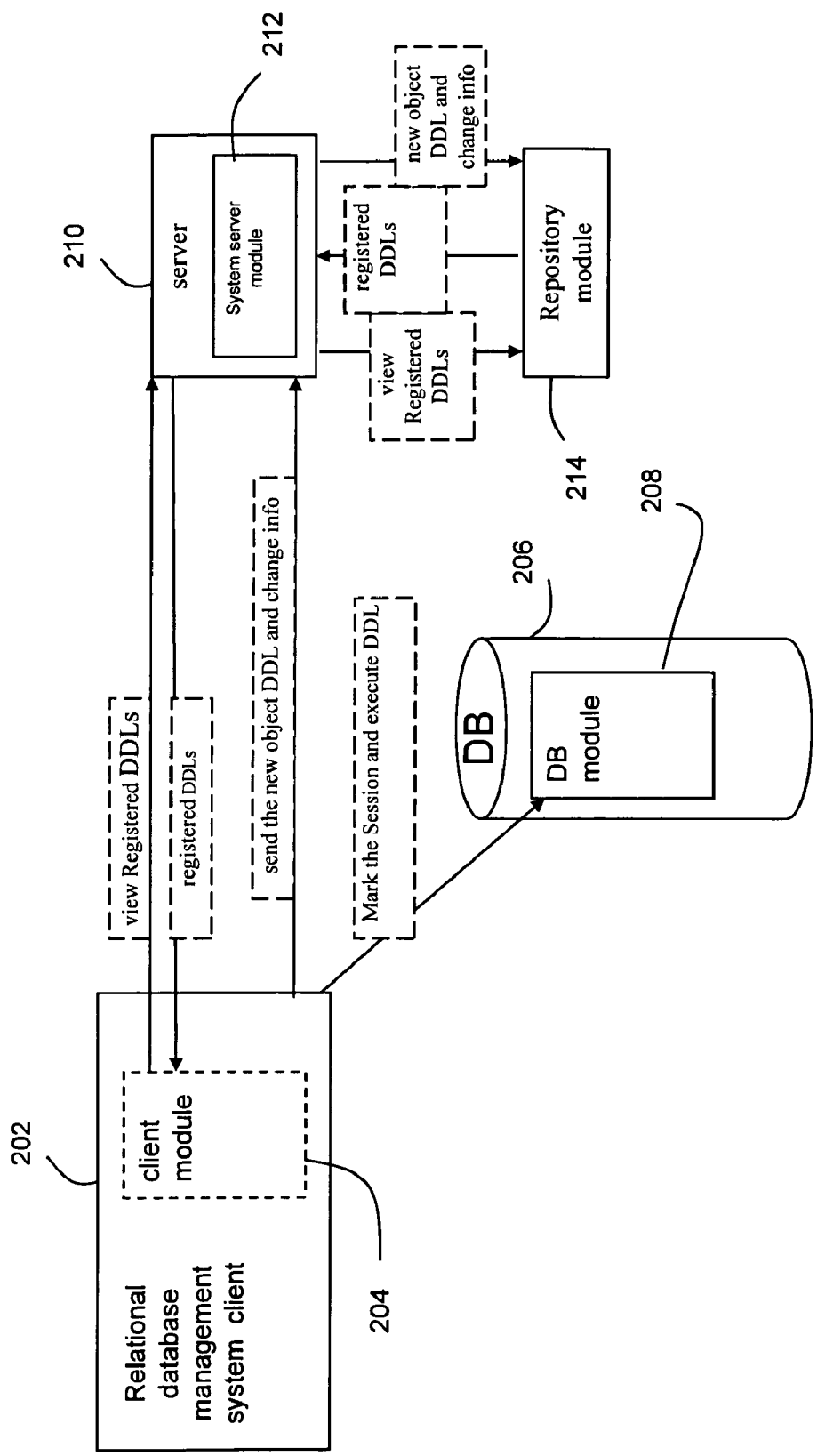
FIG. 4 illustrates a commit scenario according to certain embodiments of the present invention.

FIG. 4 illustrates a commit scenario according to certain embodiments of the present invention.

Following a sequence of DDL commands entered by the user using the DBMS client 202, as illustrated in FIG. 3, the user chooses the commit option, for example by clicking a "commit" button, a feature implemented by the client module 204. A "view registered commands" request is sent from the client module 204 to the System server module 212. System server module 212 queries the repository for the corresponding user's registered DDL commands, obtains the list of relevant DDL commands and forwards them back to the client module 204. The user goes over the DDL commands, selects and marks the ones for commit operation. The commands are tested against a condition termed "release criterion" as explained in detail below and in case the criterion is met, released to DB 206 for execution. The commands are recognized by DB module 208 as commit approved DDL commands. DB module 208 releases the commands to the DB for execution. According to some embodiments, client module 204 sends the new object DDL and change info such as the full creation DDL (explained in detail below) to the System server Application module 212 which updates the repository. The commands are inserted to the history storage in the repository.

Figure 5:
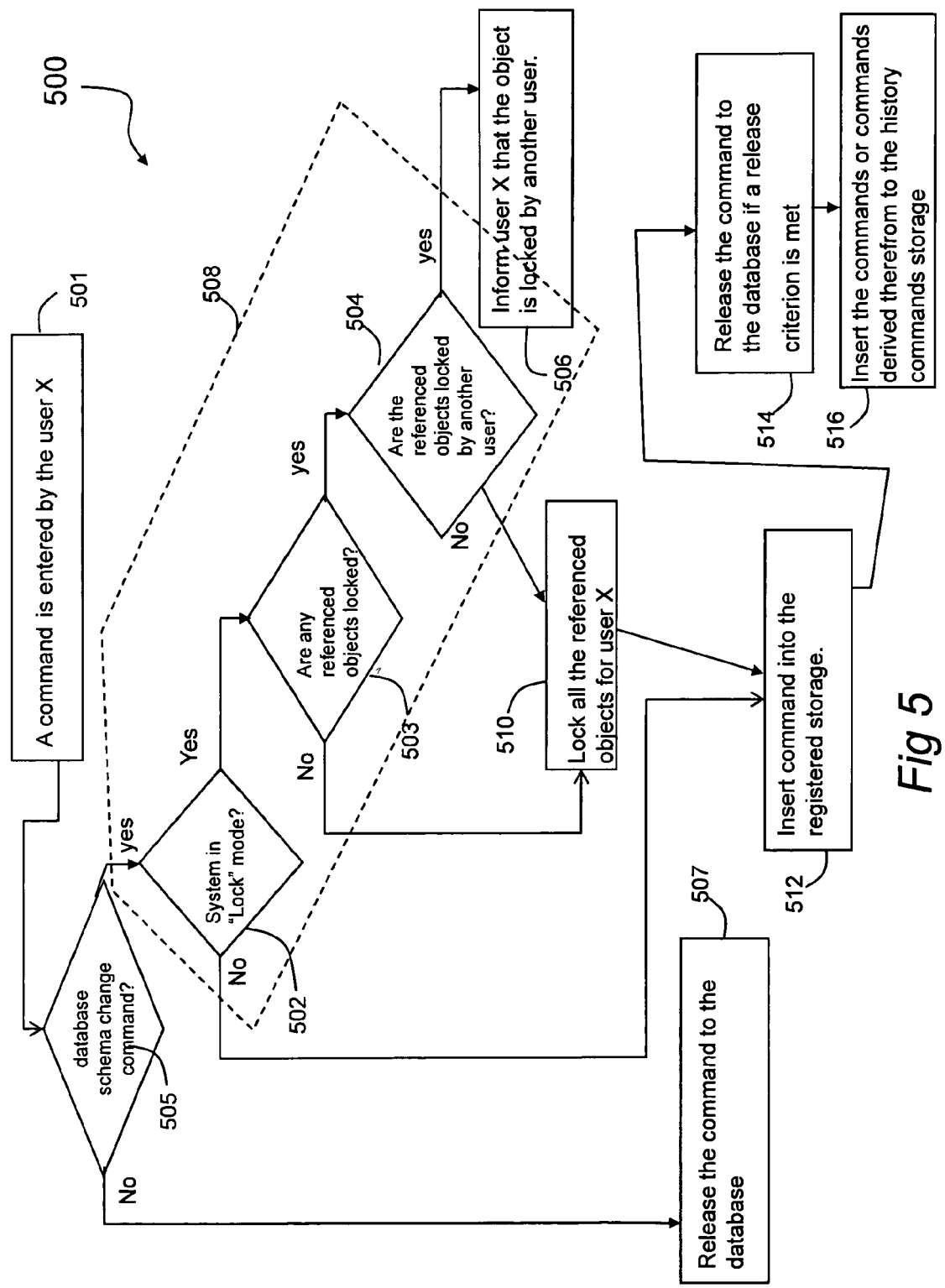
FIG. 5 is a flowchart illustrating the steps following a DDL command entered by a user according to certain embodiments of the present invention.

FIG. 5 is a flowchart illustrating the steps following a command entered by a user according to certain embodiments of the present invention. In other embodiments of the invention, fewer, more, or different stages than those shown in FIG. 5 may be executed. The stages may be executed in a different order than shown in FIG. 5, and/or in some embodiments one or more stages may be executed simultaneously. Each of the stages of method 500 may be executed automatically (without user intervention) or semi-automatically. In step 501, a command is entered by user X. The command is analyzed to determine if it is a database schema change command 505. In accordance with certain embodiments, a set of rules is used in this analysis. Each rule specifies a list of DDL keywords (e.g. ALTER, DROP, CREATE etc), a set of regular expressions and string manipulation methods in order to differentiate the DDL commands from other commands. In accordance with certain embodiments, the system also provides the database administrator with an option to add new rules and keywords in order to define additional types of commands. For example, the administrator can add the "compile" keyword to the list of commands handled by the system. In this case, although the compile command doesn't change the compiled object structure and is therefore not a database schema change command, it will be handled by the system in a similar manner.

According to certain embodiments, in case the command is not a database schema change command it is directly released to the database, 507. In case the command is classified as a database schema change command, if the system is configured to work in the "lock mode" 502, the command is analyzed and the database object referenced by the command is checked for its lock status 503.

According to certain aspects of the present invention, in the lock mode, whenever a database object is locked by a certain user, only that particular user may alter the structure of the object (i.e. perform changes using DDL commands), while other users maintain the ability to enter DML commands for that object (e.g. manipulating the object's data using DML commands).

According to certain embodiments of the present invention, when in lock mode, once a user enters a database schema change command which references a database object, the system automatically locks this object for the user.

In accordance with certain other embodiments, a database object is locked explicitly by entering a lock command indicating the objects to be locked.

In accordance with certain aspects of the present invention, other alternative lock strategies may be used without limiting the scope of the present invention.

Having discussed some of the possible lock implementation strategies, attention is now drawn back to FIG. 5.

In case the object is already locked by another 504, the system informs user X that the object is locked by another user 506. In some embodiments, in this case, user X's database schema change command is rejected and dismissed and the process ends.

In the case the object is not locked by another user, it is locked for user X, 510. The conditions 502, 503 and 504 are an example, in accordance with certain embodiments for a "Register-lock criterion" 508, a condition that any database schema change command is checked against, prior to its insertion into the registered storage, when the system is working in "Lock mode". The Register-lock criterion is one possible set of conditions that is checked before a command is inserted to the registered storage. The Register-lock criteria are part of the general condition termed "registry criteria", a more general term for all the possible criteria that each database schema change command is checked against prior to its insertion to the registered storage. In accordance with certain embodiments, if the entered command does not fit the criteria, it will not be inserted to the registered storage. In this case it might be rejected and a message is sent to the user who entered the command.

In accordance with certain other embodiments, the registry criterion includes an "auto commit" criterion which checks if the system operates in the "auto commit mode". In accordance with certain embodiments, when the system operates in the auto commit mode, the command is not inserted to the registered storage prior to the release to the database. Instead, the command is checked against the registry criteria and if it passes the criteria, it is released to the database for execution and then inserted directly into the history storage.

In accordance with certain embodiments, the command or a command derived therefrom is inserted to the registered storage 512. The registered storage includes the commands entered by users of the system. The commands are kept in the registered storage prior to their actual release and execution in the database. According to certain embodiments, the release and execution in the database is subject to a criteria ("release criteria") check as later explained. Once a command is actually sent for execution in the database, (for example, when a user performs a commit operation, explained in detail below), the command is removed from the registered storage and inserted to the history storage.

The way that the registered storage and history storage are maintained is not bound to any specific implementation or method. Numerous suitable data structures are known in the art such as linked lists, hash tables etc. The registered storage and history storage may be stored and maintained internally in the Database (e.g. 206 in FIG. 2) or in an external Database (e.g. 210 in FIG. 2). The registered storage and history storage represent logical entities capable of being implemented in separate or shared physical memory, database etc.

The command is released to the database for execution in case a "release criterion" is met 514 and saved into the history storage 516.

In accordance with some embodiments, the release criterion that is checked prior to the actual release to the database is selected from a group which includes at least the following criteria:

Commit criterion: a "commit command" must be received from the user before the database schema change command is released to the database for execution. Database commands which are intended to be released to the database only when a corresponding commit command is entered are inserted to the registered storage marked by a commit indication or tag. The tag is an indication that a "commit command" should be received for the tagged command, prior to the tagged command release to the database for execution. Those commands are termed "commit tagged commands". When a user wants to commit the "commit tagged commands" the user previously entered, the user sends a commit command specifying the "commit tagged commands" to be committed (termed "group of commit tagged commands"). The system then releases those commands to the database for execution. According to certain other embodiments, every command inserted to the registered command list is treated as "commit tagged commands" by default. In this case no additional tag indication is required.

Privilege criterion: the user who entered the command is associated with a privilege rule, which indicates which database objects the user is allowed to change. The privilege criterion verifies that the user has the required permission to change the structure of the database object referenced by the released command.

Conflict criterion: the command to be released should not cause changes to objects so that other commands stored in the registered storage would fail when later released.

Time criterion: database commands which are intended to be released to the database only when a corresponding time restriction is met (termed "time tagged commands") are inserted to the registered storage marked by a time restriction indication. The time those commands are released to the database for execution ("time of release") should conform to the time restriction indication.

Consistency criterion: the command should be consistent with the structure of the referenced object at the time of release. For example, according to certain embodiments, in case the command is referencing a column of a database table that does not exist at time of release, the consistency criterion is not met and the command is not released to the database for execution.

Release-lock criterion: the object referenced by the released command should not be locked by another user at the time of release.

The release criterion may include a combination of criterions from the above group. The release criteria given above are examples of possible criteria and other release criteria may be used in a non-limiting manner, according to other embodiments of the present invention.

As will be detailed below, once a command is actually sent for execution in the database, it is removed from the registered storage and a corresponding command is concurrently inserted to the history storage. The history storage therefore includes commands that were already executed.

In accordance with certain other embodiments, the system may be in "merge mode". In this case, several users are allowed to enter database schema change commands referencing the same object concurrently, as opposed to the "lock mode". Once one of those commands is released to the DB for execution and there are other database schema change commands entered by other users in the registered storage which are referencing the same object, modifications to the other database schema change commands referencing the same object may take place through a process termed "merge" as will be explained in greater detail below.

As previously explained, the history storage includes commands that have been already executed. When commands are inserted to the history storage, additional data may be inserted such as the time and date, the identity of the user who entered the command, the user who performed the commit operation, the target database name, users' comments etc.

In accordance with certain embodiments, each entry in the history storage includes a derivative of the original entered command, termed "full creation command". According to certain embodiments, a full creation command is a command derived from the structure of the object before or after the execution of the current command entered by the user. The execution in the database of the full creation command causes the object to be created from scratch, with a structure identical to the structure of the object after the execution of the original command. In other words, full creation command allows creating the object's structure without requiring the sequence of commands that lead to that structure or any further additional data.

Figure 6:
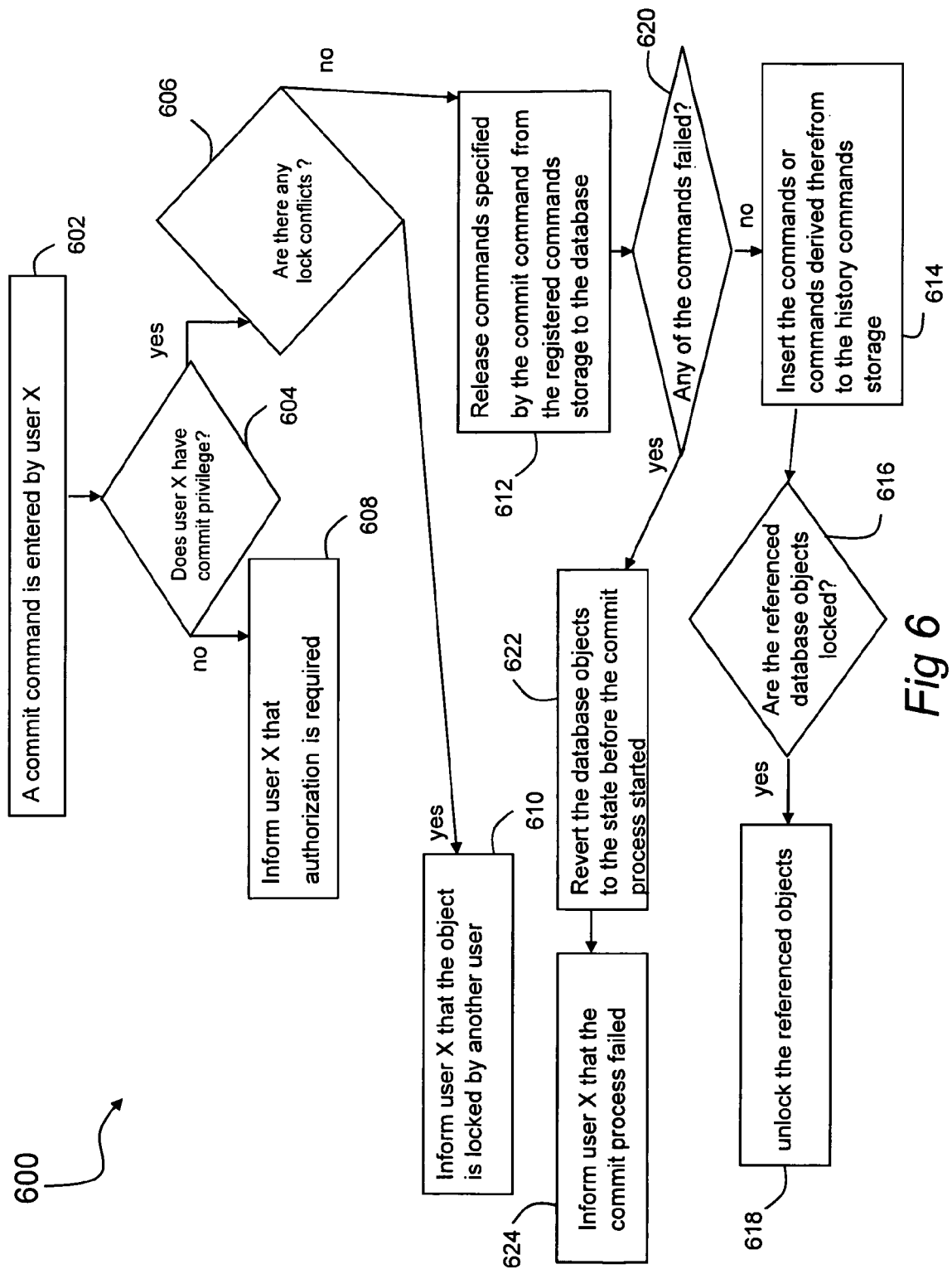
FIG. 6 is another flowchart illustrating the steps following a commit command according to certain embodiments of the present invention.

Having described the general way a command is processed once entered by a user, attention is now drawn to FIG. 6 which is a flowchart illustrating the steps following a commit command according to certain embodiments of the present invention. In other embodiments of the invention, fewer, more, or different stages than those shown in FIG. 6 may be executed. The stages may be executed in a different order than shown in FIG. 6, and/or in some embodiments one or more stages may be executed simultaneously. Each of the stages of method 600 may be executed automatically (without user intervention) or semi-automatically.

As previously stated, according to certain embodiments, the user may enter a command with a "commit" tag or indication. In this case, it is inserted to the registered storage and is not immediately or automatically sent to the database for execution. Once the user is ready to actually execute the commands, the user applies the commit operation as illustrated in FIG. 6.

In step 602 a commit command is entered by user X. As previously described, according to certain embodiments, a release criterion analysis is carried out prior to the release of the command to the database. In steps 604 and 606 two such criteria are analyzed. In other embodiments of the invention, fewer, more, or different criteria analysis than those shown in FIG. 6 may be carried out. The steps of this analysis may be executed in a different order than shown in FIG. 6, and/or in some embodiments one or more stages may be executed simultaneously. The system verifies that user X has a commit privilege 604. The system determines which commands from the registered storage are to be released, as specified by the commit command. Each type of commit command specifies a different logic to determine which commands should be released to the database following a user's commit command.

In accordance with certain aspects of the present invention, the commit command is of type "user commit command". Upon receiving a user commit command, all the commit tagged commands in the registered storage that were previously entered by the same user are released.

In accordance with certain aspects of the present invention, the commit command is of the type "object commit command". Upon receiving an object commit command specifying a certain object, all the commit tagged commands in the registered storage referencing that specific object are released.

In accordance with certain other aspects of the present invention, a commit command of type "project commit command" is applied. Upon receiving a project commit command, all the commit tagged commands in the registered storage that are referencing database objects listed under the same project, as the project specified by the project commit command, are released.

In accordance with certain other aspects of the present invention, a commit command of type "task commit command" is applied. Upon receiving a task commit command, all the commit tagged commands in the registered storage that are associated with the same task as the task specified by the task commit command, are released.

In accordance with certain other aspects of the present invention, a commit rule of type "all registered commands commit rule" is applied. In this case, upon receiving a commit command, all the commands in the registered storage are to be released.

In accordance with certain other aspects of the present invention, a commit command of type "single command commit command" is applied. Upon receiving a single command commit command, the last command entered by the user is released.

In accordance with certain embodiments, a commit command of type "selected commands commit command" is applied. The user selects a group of specific commands from the registered storage and commits them.

In accordance with certain embodiments, the database objects referenced by those commands are checked for the lock status 606. In case some objects are locked by other user, the user is informed 610 and the commit operation is not carried out.

In case no lock conflicts are recognized in step 606, the commands defined by the commit rule are released to the database 612.

According to certain embodiments, in case any of the commands released to the database during the commit process fails to execute 620, the effect of the entire commit process (i.e. the effect of the commands already executed due to the ongoing commit process) is reverted ("undo operation") 622 and the user is informed that the commit process failed 624.

In accordance with certain embodiments of the present invention, the system is configured to work in an "auto-commit" mode. In this mode, each command entered is immediately and automatically committed (without the need for an explicit commit command from the user).

In case user X does not have a commit privilege, the system informs the user that authorization is required 608.

In accordance with certain aspects of the present invention, other alternative commit rules and policies may be used without limiting the scope of the present invention.

In accordance with certain embodiments, the executed commands or commands derived from them are inserted to the history storage 614.

In accordance with certain embodiments, the system checks whether the database object referenced by the committed commands are locked 616 and unlocks them in case those objects were previously locked 618.

Figure 7:
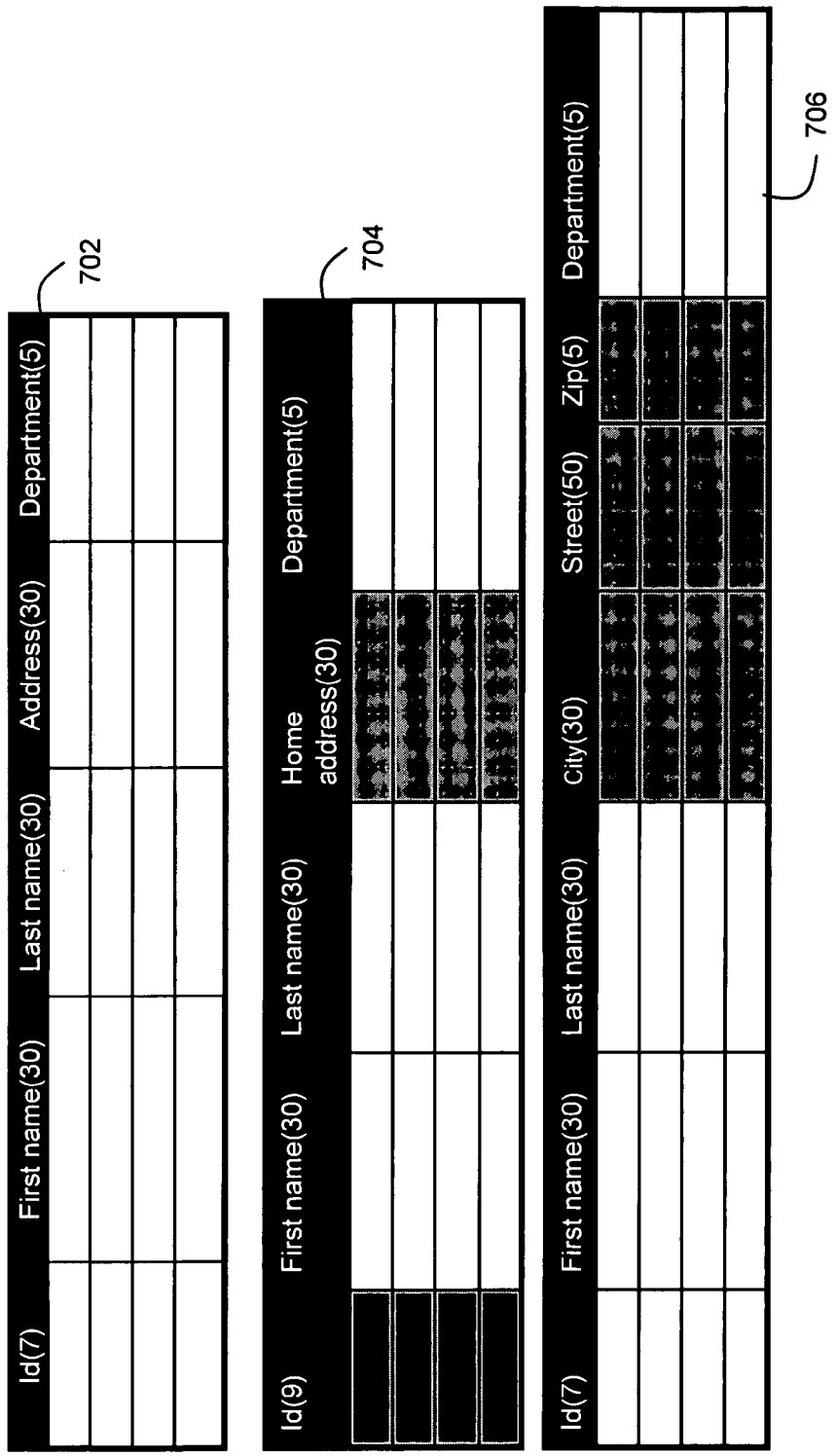
FIG. 7 illustrates a conflict scenario according to certain embodiments of the present invention.

Attention is now drawn to FIG. 7 which illustrates a conflict scenario according to certain embodiments of the present invention. The conflict scenario is used to demonstrate the lock operation.

"Employee" table 702 contains the columns: Id, First name, Last name, Address and Department.

Sharon is one of the software developers and would like to introduce changes to the "Employee" table, for example, change the name of column "address" to "home address" in order to get the table 704.

At the same time, Moshe plans to split the "Address" column into "City", "Street" and "Zip Code" columns in order to get the table 706.

If the conflicting DDL commands are entered simultaneously, the conflicting changes to the "Address" column of the "Employees" table may cause the final object to have a structure unwanted by neither of the users. It may also result in at least one of the DDL commands failing to get executed. For example, if Sharon's command is entered first, the name of the column is changes to "home address". Now, when Moshe's command, which references the column "Address", is entered, it will fail, because it references a column which no longer exists. In accordance with certain embodiments, in case the system is configured to work in "auto-lock" mode, when a user enters a command, the object referenced by the command is automatically locked, as demonstrated below. Sharon is the first to access the "Employees" table (i.e. the first to enter a DDL command targeting object "Employees"):

>alter table employees modify id number(9);

The system intercepts the DDL command and locks the "Employees" table uniquely for Sharon.

Moshe then enters a DDL command to add the "city" column:

>alter table employees add city varchar(30);

Because the "Employees" table is already locked by Sharon, the system will notify Moshe:

"Table employees already locked by Sharon".

Moshe will then have to wait for Sharon to finish his changes on "Employees" table. Only when Sharon has completed performing his changes and unlocks the table, Moshe will be free to enter additional DDL commands and introduce his planned changes to the "Employees" table.

Figure 8:
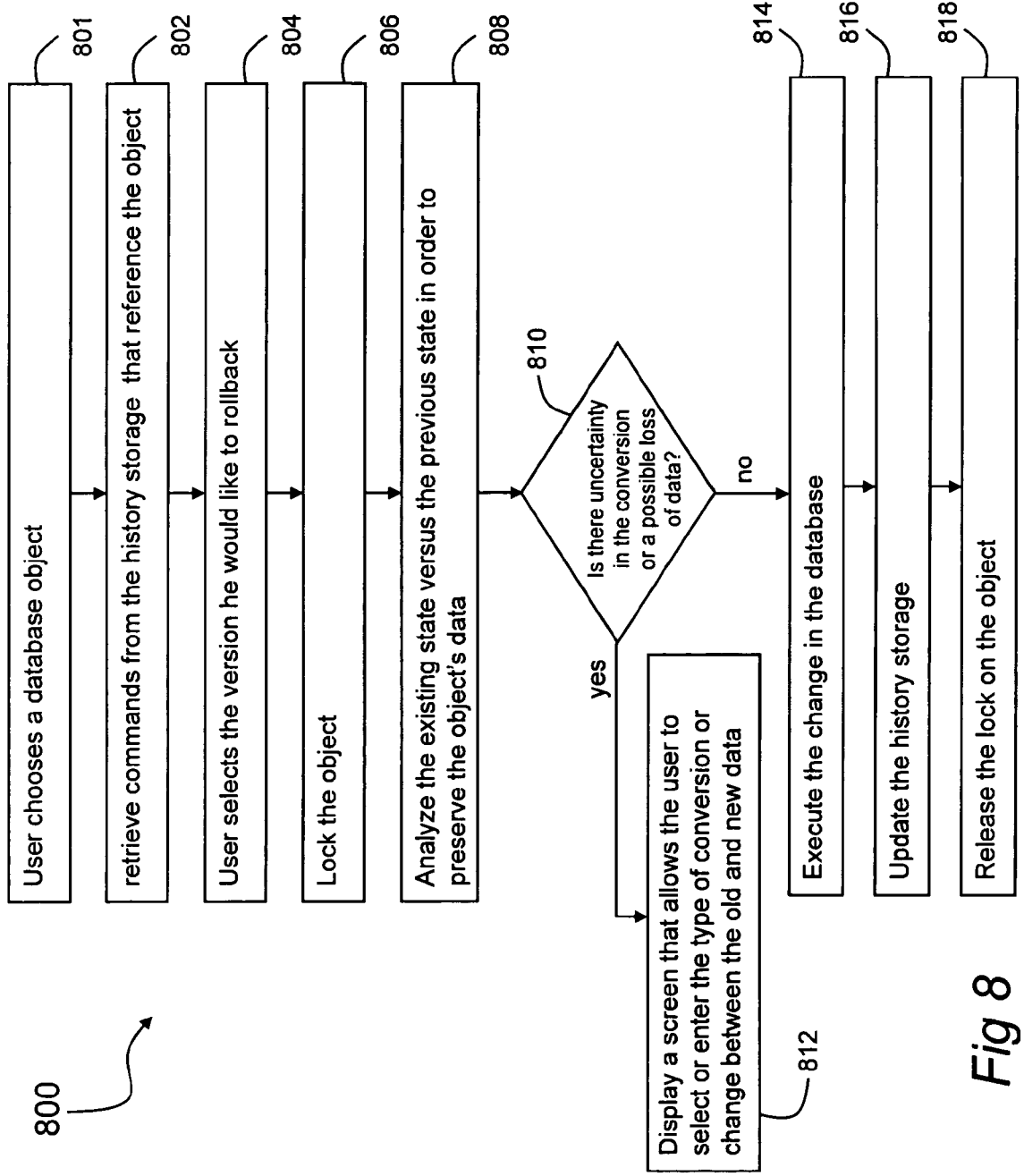
FIG. 8 is a flowchart illustrating a rollback process according to certain embodiments of the present invention.

Attention is now drawn to FIG. 8, which is a flowchart illustrating the rollback process according to certain embodiments of the present invention. In other embodiments of the invention, fewer, more, or different stages than those shown in FIG. 8 may be executed. The stages may be executed in a different order than shown in FIG. 8, and/or in some embodiments one or more stages may be executed simultaneously. Each of the stages of method 800 may be executed automatically (without user intervention), or semi-automatically.

Database schemas are dynamically changing and at certain times a need emerges to go back to a former version of a database object, project etc. This process is termed "rollback" and its implementation in accordance with certain embodiments of the present invention is illustrated below.

The following is an example of a rollback process which causes a specific database object to change to a former version (termed "object rollback"). The user chooses a database object on which to perform the rollback 801. The system then retrieves those commands from the history storage (which includes, among other data, the DDL commands formerly executed for the object or commands derived therefrom) which reference the corresponding object. The system presents those commands to the user 802. The user selects the version to rollback to 804 (i.e. a specific DDL command from the history; also termed "target command"). For example, the user selects a former version based on the time or date of the version, the nature of the changes that occurred in the object or the users who entered the changes. The object is then locked 806. The system analyzes the existing state of the object versus the previous state in order to preserve the data in the table 808 as will be illustrated below.

In accordance with certain embodiments of the present invention, further analysis is carried out in order to detect any uncertainty in the conversion between the versions or a possible loss of data due to the rollback process 810. In this case, the system displays to the user various alternatives to select from, offering ways of conversions between the two versions 812 (As will be further detailed below).

For example, the present version of a table includes a column named "employee's name" whose size is 50 characters and in the version of the table the user would like to rollback to the size of that column is only 30 characters. The system detects a possible data loss because any data entry which is longer than 30 characters in the current version would be necessarily truncated. The system offers the user different ways of converting the longer data entries to shorter versions.

In another example, the current version of a table named employee includes two columns, namely "employee first name" and "employee last name" each one of size 30 characters, while the version of the table the user would like to rollback to includes only one column named "employee name" whose size is 60 characters. The system recognizes the uncertainty resulting from the need to reduce two columns to one and offers the user different ways of conversion, such as copying the data from one of the current version columns to the column of the rollback version and dismissing the second column or alternatively, adding the content of the two current version columns and inserting it into the rollback version column.

In yet another example, a table includes a column named "employee ID" of a numerical type. A user changes the column type to a textual (CHAR) type. Next, another user chooses to rollback to the older table version. A conversion is needed in order to maintain the data content of the column. In accordance with certain embodiments, the system recognizes the need for numerical conversion of a text, and performs the conversion automatically, or, according to other embodiments, would suggest this particular conversion to the user. The user is prompted to manually choose the right way of converting the data to the rollback version.

In accordance with certain embodiments, the system may suggest at least one possible solution in order to resolve the uncertainty or data loss. The user may choose one of such suggestions, or otherwise enter a different conversion solution based on his knowledge or preferences.

Having described several examples for object versions conversion, attention is drawn back to FIG. 8.

In accordance with certain embodiments, at least one DDL command is sent to the database for execution in order to perform the required changes to the object 814. This command or a command derived therefrom is inserted to the history storage 816 and the object is unlocked 818.

FIG. 8 illustrates the rollback process in the case of an "object rollback command", according to certain embodiments of the present invention.

An object rollback command is a command sent by the user which specifies an object's version to rollback to using a specific command from the history storage (which the user chooses). The rollback process then attempts to change the object's structure to the structure it formerly had after the execution of that specific command from the history storage (termed "command execution time"), while the current object data will be converted to fit the old structure.

In accordance with certain embodiments, the command's execution time is defined as the time the command was entered by the user.

In accordance with certain other embodiments, the command's execution time is defined as the time the command was released to the database.

In accordance with certain other embodiments, the system supports a project rollback command. A project rollback command specifies which project and project version to rollback to using a specific command from the history storage. A project rollback command allows the user viewing the changes related to a specific project, as reflected by the sub groups of commands from the history storage that relate to that particular project, to select a specific command from this sub-group of commands and rollback to a corresponding older project version. The rollback process then attempts to change all the objects associated with the specific project to former versions. The structure of those objects is changed to the structure they formerly had after the execution of that specific command from the history storage and the current object data will be converted to fit the old structure, as previously explained.

In accordance with certain other embodiments, the system supports a timestamp rollback command. A timestamp rollback command specifies a database version to rollback to using a specific command from the history storage. A timestamp rollback process first allows the user viewing the changes to the database as reflected in the history storage. The user then selects a specific command from the history storage and rollback to a corresponding older database version. The rollback process then attempts to change all the objects of the database to the corresponding former versions. The structure of these objects is changed to the structure they formerly had after the execution of a specific command from the history storage and the current object data will be converted to fit the old structure, as previously explained. The above examples of different rollback command types are given for illustrative purpose and other alternative rollback command types may be used, according to other embodiments of the present invention.

Figure 9:
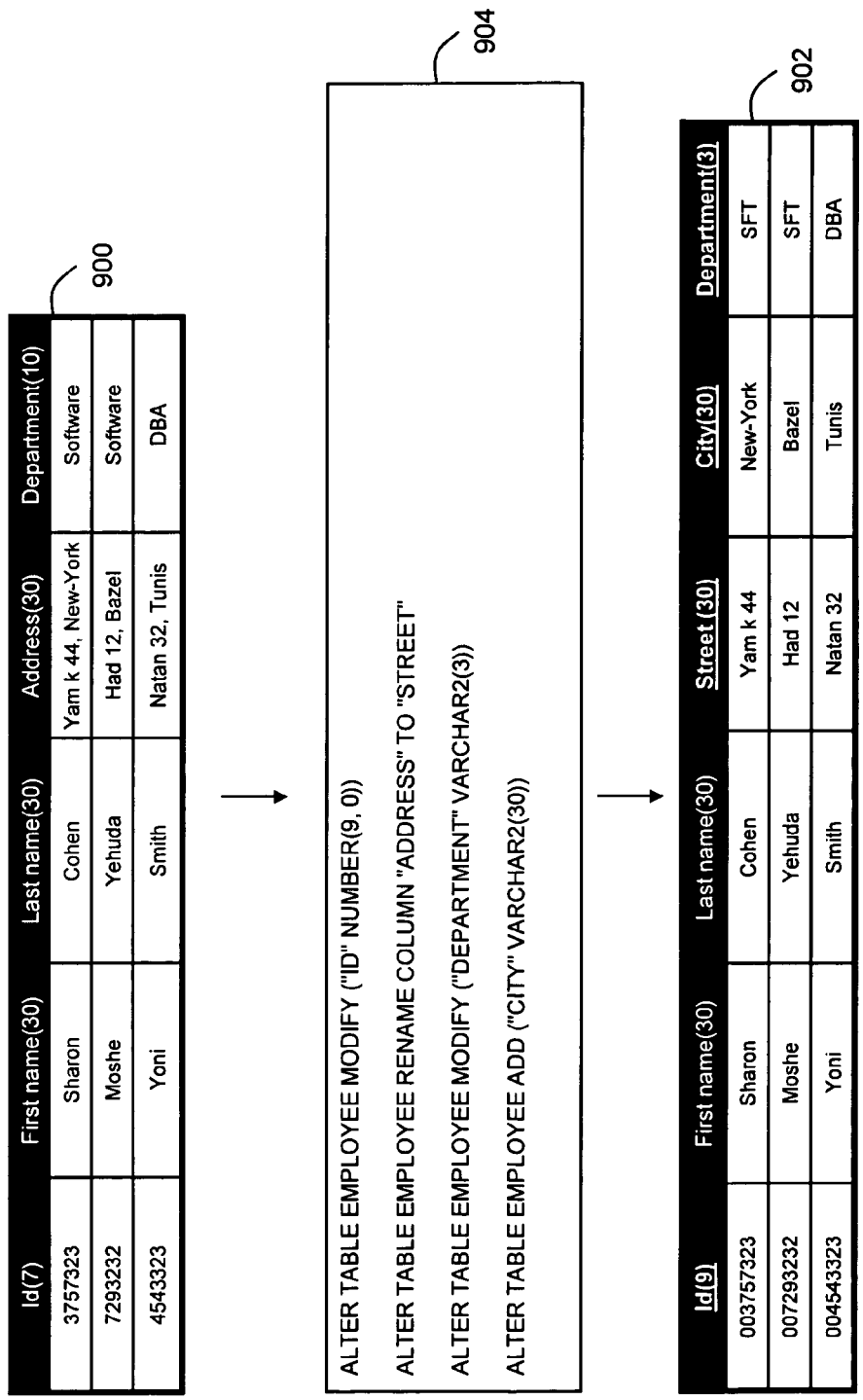
FIG. 9 illustrates a typical rollback scenario according to certain embodiments of the present invention.

Having described the rollback process, attention is now drawn to FIG. 9 which illustrates a typical object rollback scenario according to certain embodiments of the present invention.

In the first version created, "Employee" table contains the columns: Id, First name, Last name, Address and Department 900.

The user Sharon creates a second version 902 by performing the following changes to the "Employees" table:
1. Resize the ID column from 7 digits to 9 digits.
2. Rename "Address" column to "Street".
3. Add "City" column.

Sharon's actual commands are shown in box 904. Moshe, a second user, would like to dismiss Sharon's changes to the "Employees" table as a part of a large group of applicative changes.

Figure 10:
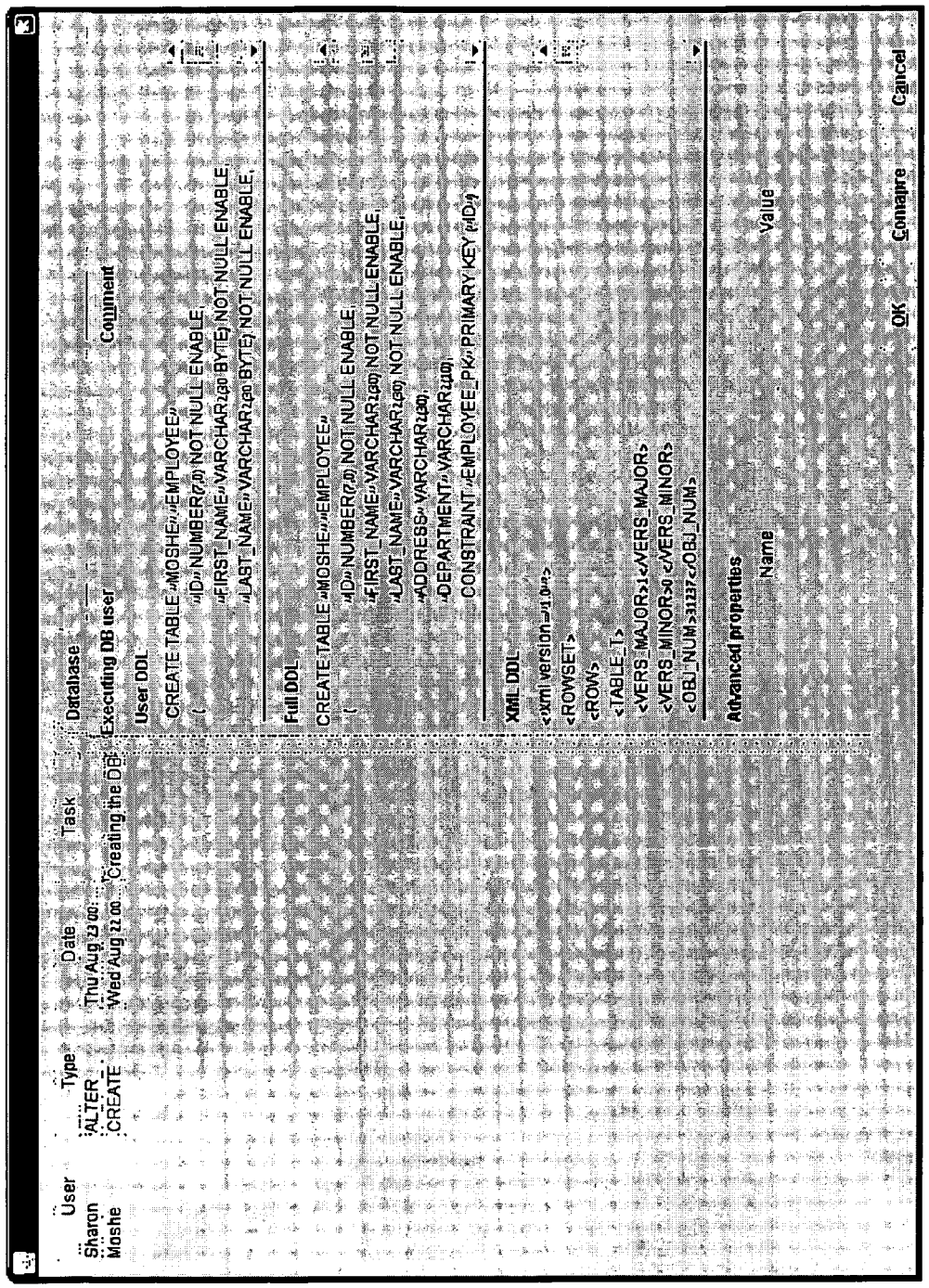
FIG. 10 illustrates an application screen shot according to certain embodiments of the present invention.

Moshe selects the "Employee" table and is presented by the system with the commands from the history storage that reference table "Employee" as further illustrated in FIG. 10.

FIG. 10 continues the example given in FIG. 9 and presents an application screen shot of history storage content as presented to the user Moshe, according to certain embodiments of the present invention.

The history screen details former changes made to an object (in the case of the example, "Employees" table). Each row in the history table represents a single version of the corresponding object. The history screen allows viewing, for example, the changes made to the object, the user who made the change, date, comment etc. By selecting a specific row from the history table, additional data regarding the specific selected version may be retrieved. For example, the DDL that was executed to create that version, the corresponding full object's DDL command and also an XML representation of the object's properties. The window also includes advanced information of objects changes such as renaming, creating, and even dropped and recreated objects.

Moshe browses through the changes formerly made to the "Employees" table, as reflected in the history records. Moshe then chooses the row (version) he would like to rollback to and sends the rollback command.

Figure 11:
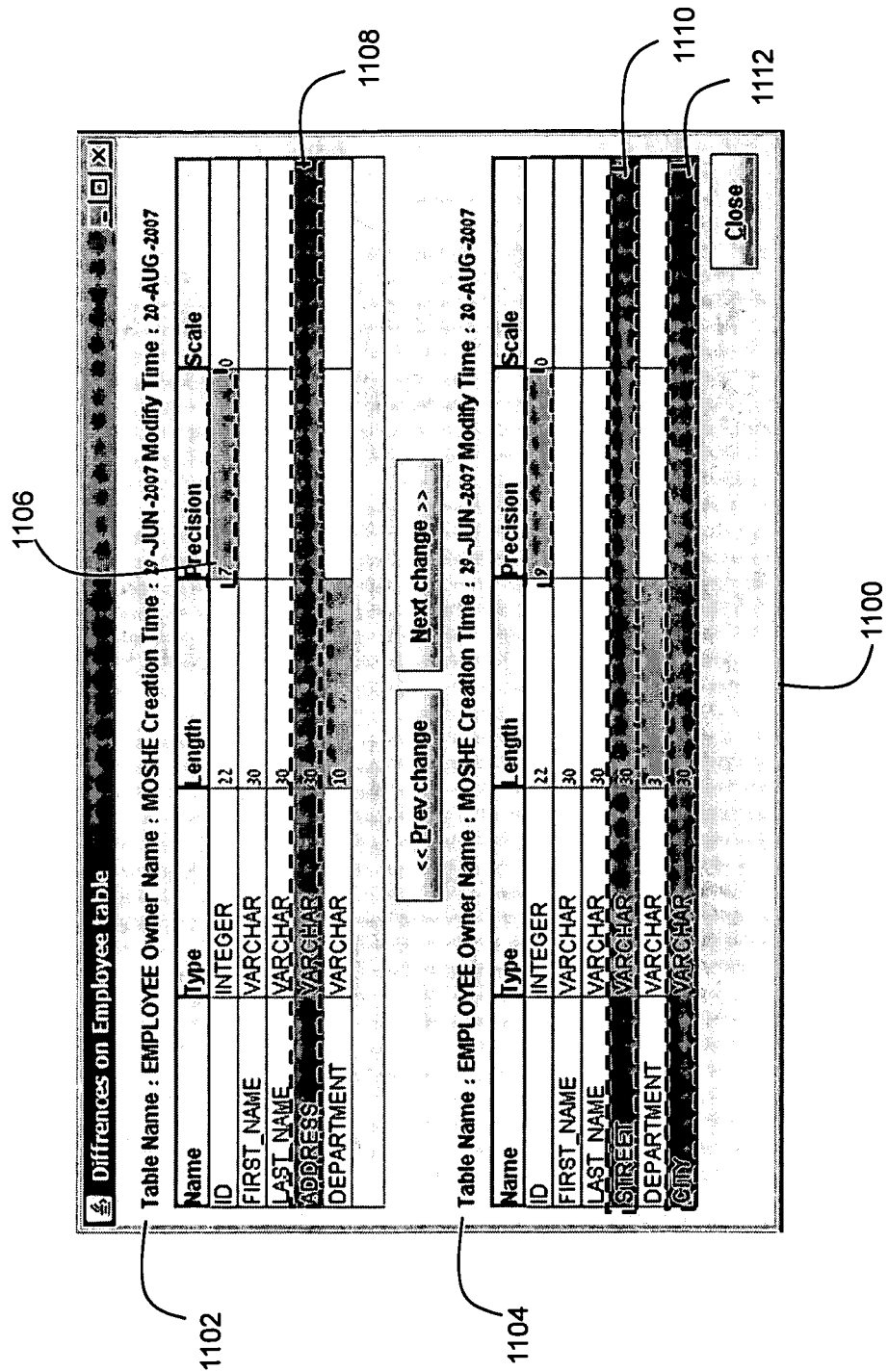
FIG. 11 illustrates another application screen shot according to certain embodiments of the present invention.
Figure 12:
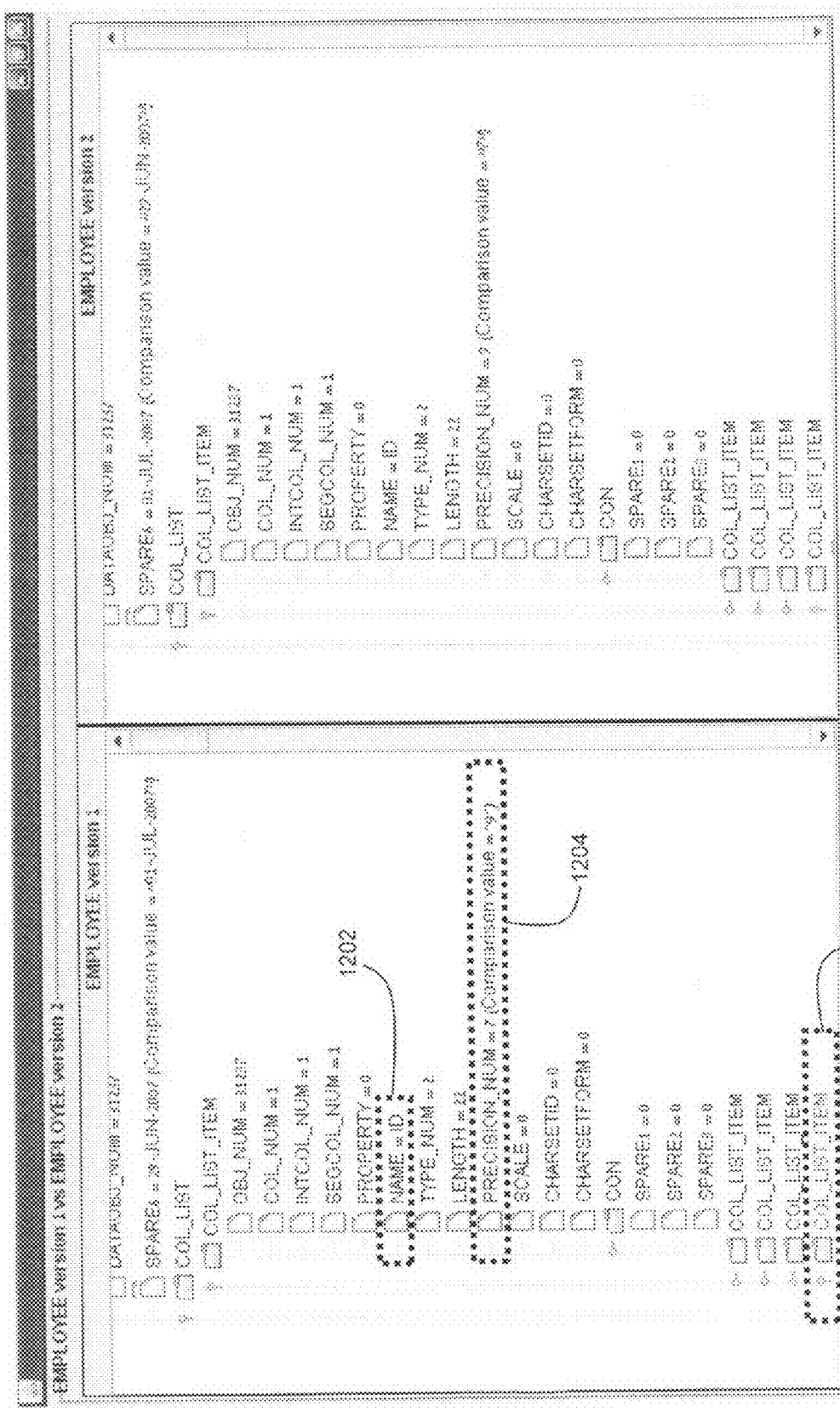
FIG. 12 illustrates another application screen shot according to certain embodiments of the present invention.

Moshe is able to compare any two versions of "Employees" table using the tools "Visual Table Diff" (FIG. 11) or "Visual Tree Diff" (FIG. 12).

With the "Visual Table Diff" (FIG. 11), the user is able to visually view the differences between the tables as illustrated.

The screen (1100) is designed to compare a table or a view object. The screen compares the basic table information (1102, 1104) such as name, modify date, constraints, etc and the columns structure (1106, 1108) such as names, type, size, etc.

In the particular example shown in FIG. 11, a comparison of different versions of the EMPLOYEE table is shown. Each row in the comparison window represents a column in the table.

The screen displays changes in the columns structure by marking the relevant column property with a different color (1108).

The screen also displays new or missing columns with a different background color for the entire row (1108, 1110, and 1112).

With the "Visual Tree Diff" (FIG. 12), the user is able to view any differences between any two database objects.

The screen (1200) is designed to compare objects' numerous details.

The database is queried for the structure of the object as XML and displays it as an information tree (1206), the tree leaves display the object's properties such as column name (1202) precision, scale etc.

Identical nodes have the same visual characteristics (1202) and different nodes are marked with different colors (1204).

As previously explained, in accordance with certain embodiments of the present invention, the system is configured to work in "merge mode". In this mode, several users are able to enter commands simultaneously, that reference the same object. In case the commands are entered as "commit" commands, they are stored in the registered storage, as long as the commit command is not received. In this case, certain commands may create a conflict with other commands in the registered storage. Such conflicts arise for example in a case where a DDL command which is sent to the database for execution may change an object in a way that would cause other DDL commands already in the registered storage to become invalid.

Figure 13:
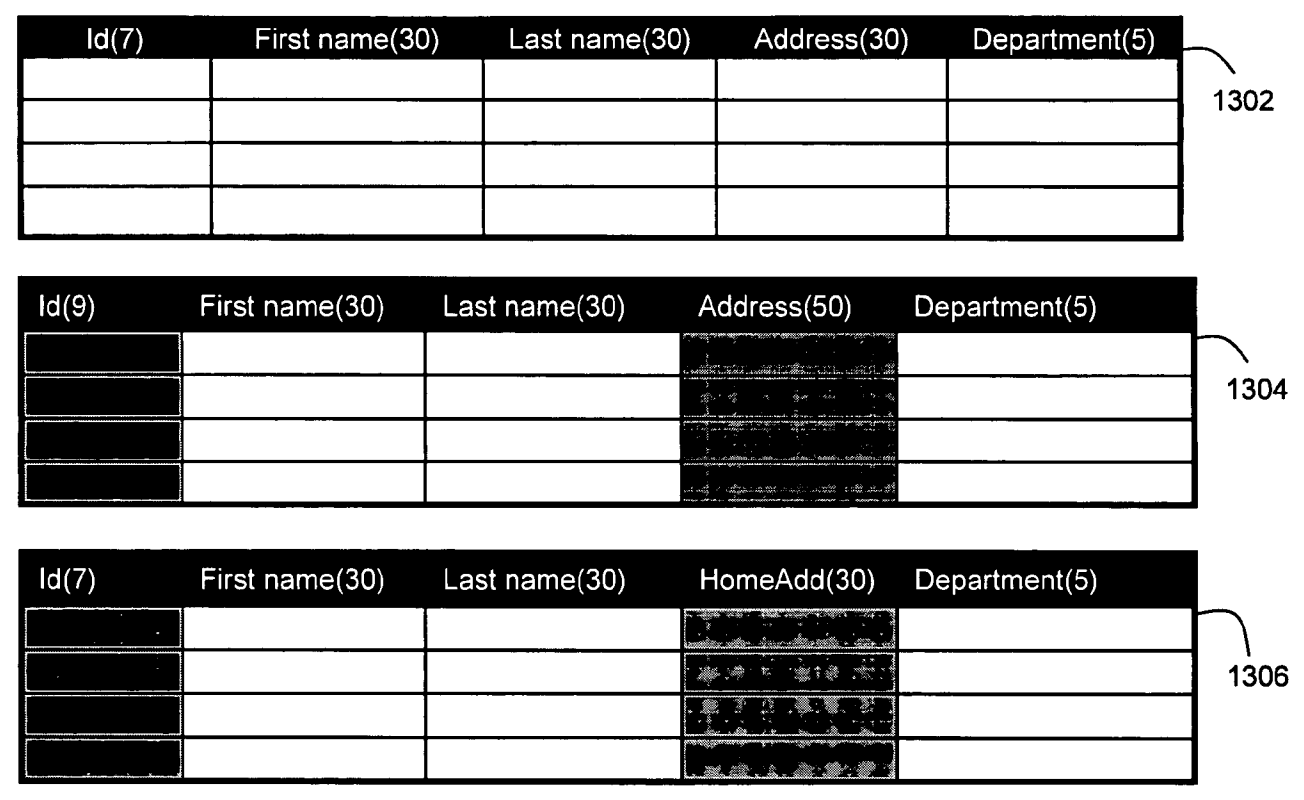

In accordance with certain embodiments of the present invention, a merge process is required in order to avoid conflicts between such DDL commands. FIG. 13 illustrates such a conflict scenario according to certain embodiments of the present invention. "Employee" table 1302 contains the columns: Id, First name, Last name, Address and Department.

While the system is in "merge" mode, Sharon, one of the software developers, enters a commit tagged DDL command which resizes column ID from 7 digits to 9 digits, and resizes the Address column from 30 characters to 50 characters in order to get the table 1304.

At the same time, Moshe enters a commit tagged DDL command which renames column "Address" to "HomeAdd" in order to get the table 1306. Since the system is configured to work in "merge mode" rather than "lock mode", both user's commands are accepted and inserted into the registered storage.

Moshe now sends a commit command and his DDL command is released for execution in the database. The "Employee" table is changed and the "Address" column name is deleted (1306).

The DDL command Sharon has entered is therefore no longer valid since the column "Address" it is referencing no longer exists.

The merge process occurs when Moshe's command is sent for execution in the database. The merge process recognizes the conflict and alters Sharon's registered DDL by replacing the reference to the "Address" column by a reference to the updated name "HomeAdd".

Figure 14:
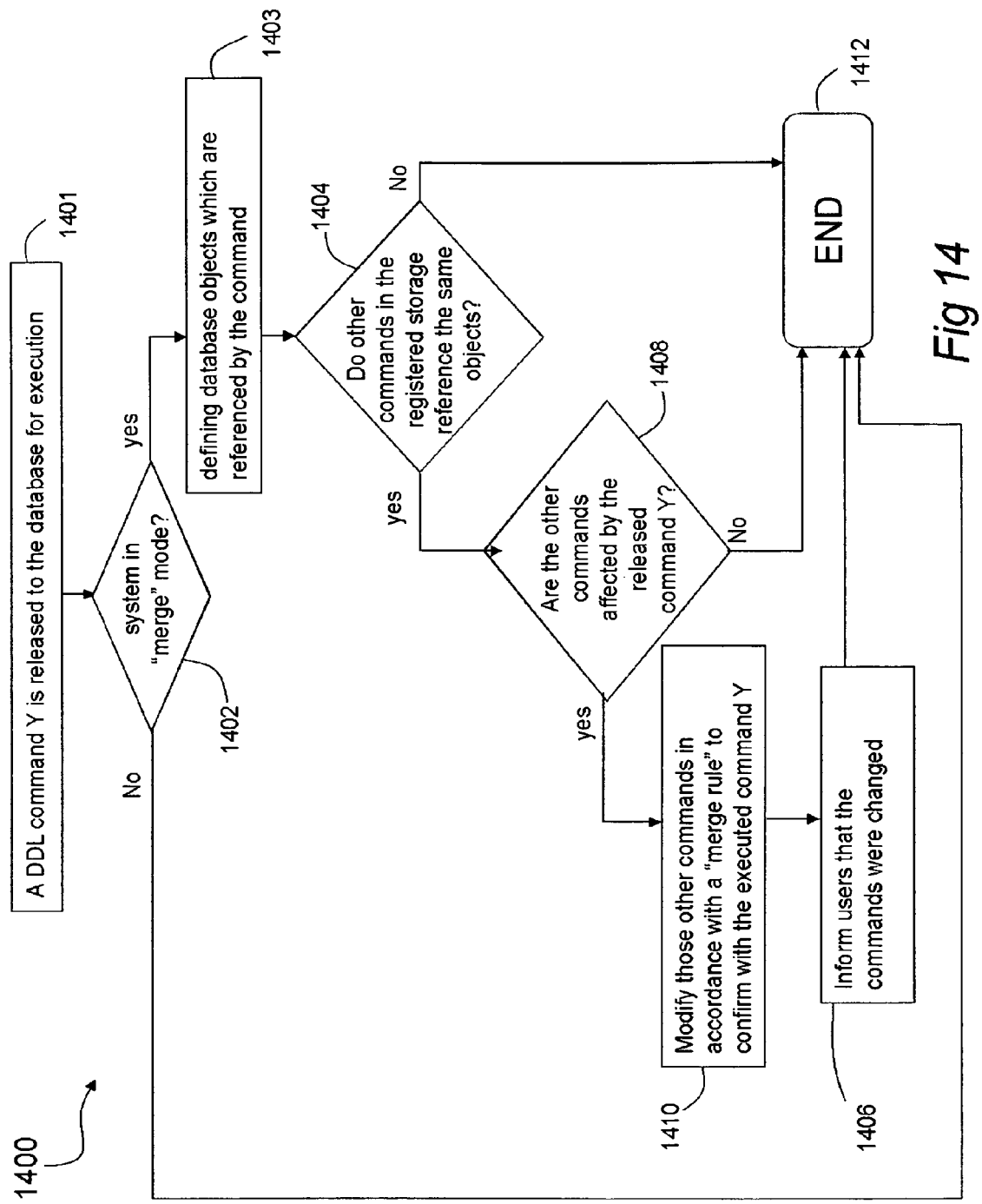
FIG. 14 is a flowchart illustrating a merge process according to certain embodiments of the present invention.

Having described a scenario which necessitates a merge operation, attention is drawn to FIG. 14 which is a flowchart demonstrating a merge process according to certain embodiments of the present invention. In other embodiments of the invention, fewer, more, or different stages than those shown in FIG. 14 may be executed. The stages may be executed in a different order than shown in FIG. 14, and/or in some embodiments one or more stages may be executed simultaneously. Each of the stages of method 1400 may be executed automatically (without user intervention) or semi-automatically.

A DDL command Y is released to the database for execution (1401). In case the system is in "merge" mode 1402, the system defines the database object which is referenced by the command Y 1403 and checks if other commands in the registered storage reference the same object 1404. In case other commands are affected by the entered command Y 1408, such commands (termed "merge commands") are modified according to a set of rules termed "merge logic" to confirm with the changes introduced by the executed command Y, 1410. For example, if the released DDL command changes a referred object name then the former name would be changed to the new name in all the affected commands stored in the registered storage. According to other embodiments, the commit operation may be rejected and a corresponding message sent to the user, for example in case the merge commands way of modification cannot be resolved.

According to certain embodiments of the present invention, the relevant users are informed that the commands were changed 1406. Command Y is sent for execution in the database 1412.

During operations such as Rollback, a conflict may arise between the present version of an object (termed the "current version") and the version about to take its place (termed the "destination version").

A conflict may be due to a possible loss of data, resulting from the conversion of the current version to the substitute version. For example, a case in which the current version of a table has a column named "employee name" with a size of char(30) and the corresponding column in the substitute version has a size of char(20). In this case, a truncation of the strings corresponding to the employees' names longer than 20 chars would be necessary during the conversion process.

A conflict may also occur when some uncertainty related to the object's data structure arises upon the conversion. For example, a case in which the current version of a table has three columns named "employee first name", "employee last name" and "employee middle name" all having the size of char(30). The substitute version has only two columns named "first name" and "last name", both having a size of 30 characters. In this case it may not be possible to determine for certain which of the two out of the three columns of the current version should be copied to the two columns of the substitute columns during the conversion.

Similarly, a conflict may arise during the merge process when the merge process creates loss of data or involves some uncertainty-based decision.

Figure 15:
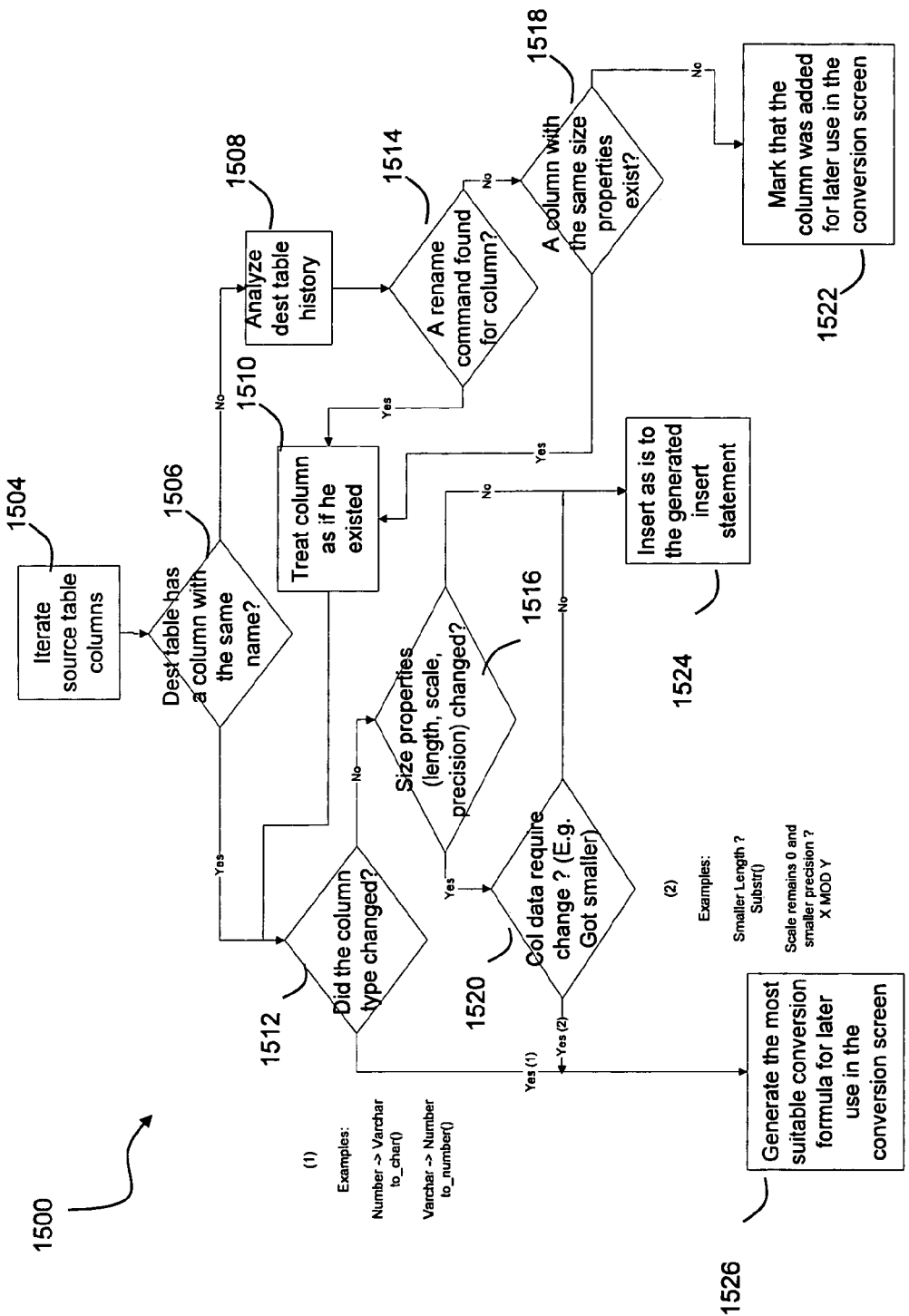
FIG. 15 illustrates a flowchart for converting a database table object in accordance with certain embodiments of the present invention.

In such cases, the conversion process requires handling a possible loss of data and may also require prompting the user for a user's decision regarding the right way to resolve the possible data loss. FIG. 15 illustrates a flowchart for such a conversion of a database table object in accordance with certain embodiments of the present invention. In other embodiments of the invention, fewer, more, or different stages than those shown in FIG. 15 may be executed. The stages may be executed in a different order than shown in FIG. 15, and/or in some embodiments one or more stages may be executed simultaneously. Each of the stages of method 1500 may be executed automatically (without user intervention) or semi-automatically.

In operation 1504 the system iterates the columns of the source table (the current version of the table) in order to detect differences in the columns structure, compared with the destination table (the version of the table to move to). For each column in the source table, the system searches a column with the same name in the destination table.

If a column with the same name is found (1506) the system checks whether the column type has changed (1512). In a case where the column type is the same, the system checks whether the column characteristics such as size or precision has changed (1516).

In a case where the characteristics are different, the system checks whether the characteristics change may cause data loss in the conversion process (1520). If there is no data loss then the system adds this column name to the generated "insert" command (1524). According to some embodiments, the generated insert command is executed following its approval by the user and is used to insert the values from the source table to the destination table. In a case where a column type change or characteristics change may cause data loss in the conversion process (1512, 1520) the system generates a data conversion "formula" specifying the way to convert data fields from one type to another (1526) (by matching one or more SQL conversion functions from the current DBMS library) for data conversion that will be displayed to the user as part of the conversion screen shown in FIG. 16. The formula is generated using a data dictionary that contains various conversion formulas. For example, from number to varchar use: TOCHAR (an internal db function that converts number to character string) another example is when the field size is reduced, then for numerical field use module operator (mathematical operator) and for VARCHAR use SUBSTR (internal db function).

In a case where the column is not found in the destination table (1506), the system screens the history storage (1508) for history commands that relate to those changes (rename, drop, etc) and if a rename command is found (1514), the column by the new name is used. In a case where the system does not find any "rename" or "drop" commands for this column, the system will try to point the user to existing columns with the same characteristics that were not previously matched (1518) which are candidates for being matched to the source table column and mark the column as added (1522) for later use on the conversion screen. This data is used to display to the user which columns were added (FIG. 16-1610) or removed.

FIG. 15 illustrates a flowchart for conversion of a database table object in accordance with certain embodiments of the present invention. In other embodiments of the invention, fewer, more, or different stages than those shown in FIG. 15 may be executed for the conversion of other types of database objects.

Figure 16:
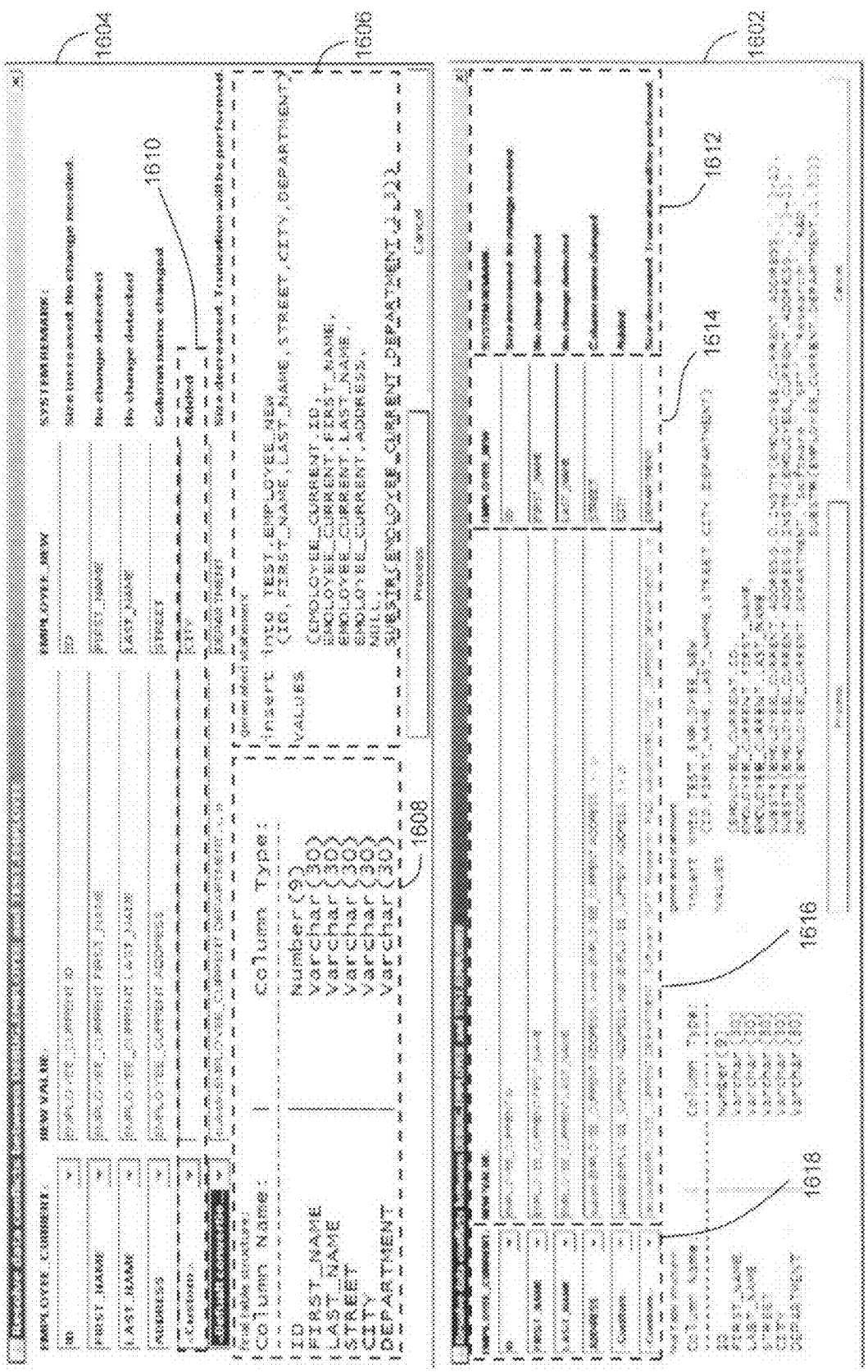
FIG. 16 illustrates an application screen shot according to certain embodiments of the present invention.

FIG. 16 illustrates an application screen shot according to certain embodiments of the present invention.

1604 is a system's default screen.

1602 is a system's screen after user customization.

1618 shows which column of the current table or a custom value will be inserted to the new table. The user can choose the column from the source table, default conversion or custom conversion.

1616 shows the conversion value that is used in order to fill the column in the new table. 1614 shows the columns of the final table. 1612 shows system remarks and warnings.

The user deploys the EMPLOYEE table from the DEBUG environment to the TEST environment. The current TEST table is renamed and the DEBUG table is created in the TEST environment using the full creation DDL.

The data copying begins according to the conversion flow chart:

The first column is ID and the column exists in both tables, and the type was not changed, but the size was changed. Although the size changed, the system detects that the new size is larger, and therefore no data manipulation is needed. (First row on column 1612)

The second and third columns (FIRST_NAME and LAST_NAME) exist in the current TEST table and did not change, therefore no manipulation is needed.

The next column is ADDRESS and it does not exist in the TEST table. The system then analyses the DEBUG environment's history records for the table and detects that there was an ALTER command for that column, and that it was renamed to STREET, and no other changes were made on it.

The system then generates the partial string of the insert command that inserts the data from the current table's ADDRESS column to the new table's STREET column (1616).

The next column CITY is a new column that does not exist in the TEST table and when analyzing the DEBUG environment's history records for the table, the system detects that the column was added and any data from the current table does not need to be inserted to that column.

If the column was created as mandatory then the "Conversion screen" notifies the user that the conversion field is required.

The bottom part of the screen displays the final table structure and the full "INSERT" statement with all the conversion functions (1606) and also the table structure that will be generated using this screen (1608).

1604 is the default screen that the system suggests to the user according to decisions described earlier.

1602 shows user customization on the default screen, where changes reflect the same deployment situation but with customized user changes.

For example:

1. The Address field was split into o two fields—STREET and CITY, and the user decides to split the ADDRESS column into the new fields according to the comma delimiter.

2. The DEPARTMANT field was truncated in debug environment to 3 characters instead of 10 characters; in order to override the default truncation, the user uses abbreviations for the department names longer than 3 characters.

Figure 17:
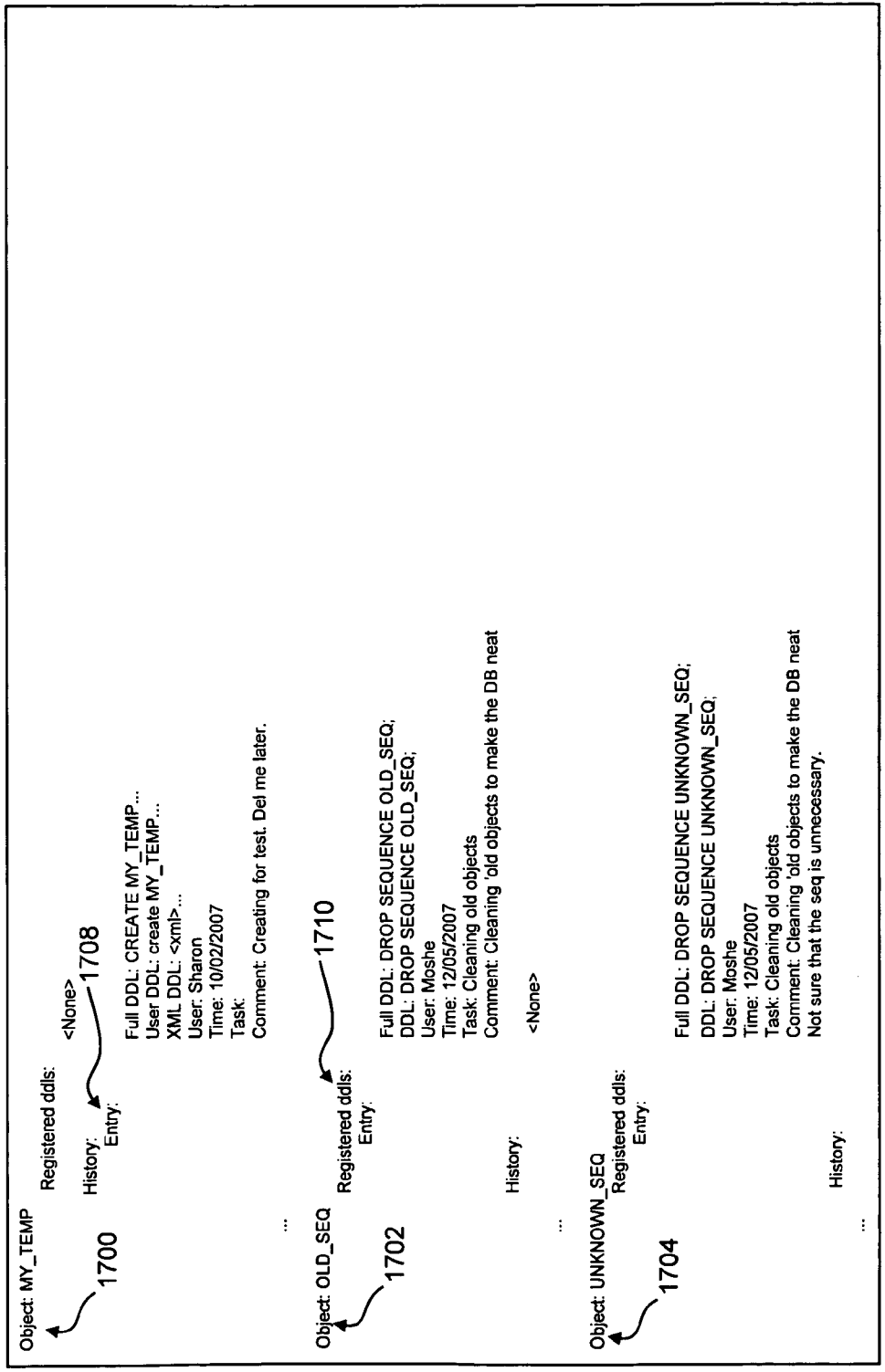
FIG. 17 illustrates a repository in accordance with certain embodiments of the present invention.

FIG. 17 illustrates a repository in accordance with certain embodiments of the present invention. The repository contains the registered storage and history storage.

The repository contains data for three objects: MY_TEMP 1700, OLD_SEQ 1702, UNKNOWN_SEQ 1704. Each object may include entries of two types. "Registered DDL" entries, such as 1710, represent DDL commands that have been entered by the user but not released for execution in the database yet. Those entries form the "registered storage". "History" entries, such as 1708, represent DDL commands that have been already executed or a derived version of such commands. Such entries form the "History storage". As seen in FIG. 17, object MY_TEMP 1700, has no registered commands stored for execution. This means no new commands were entered for this object since the last registered command was executed. Object OLD_SEQ 1702 has no "History" entries stored. This suggests no commands were yet executed for this object; the system was installed after the object was created or the object was excluded from the system's serviced objects.

Below is an example of a series of commands entered by a user, and their effect on the repository.

The user initially declares the task for which the commands belong:

>EXEC DIFFUSION_API.SET_TASK('Cleaning old objects');

By relating commands to separate tasks, users are given a way to group commands into separate logical groups. This in turn offers a tool for the management of command sets. For example, a user can perform a rollback to a version prior to the execution of all commands that belong to a certain task.

The user then adds a remark for better documentation of his operation.

>EXEC DIFFUSION_API.SET_COMMENT('Cleaning 'old objects to make the DB neat');

The user enters a DDL command.

>DROP TABLE MY_TEMP;

This command will now belong to the last defined task, and will be titled with the last defined comment.

FIG. 18 is another illustration of the repository in accordance with certain embodiments of the present invention, reflecting the last three commands entered by the user. The new DDL command is now listed as a new entry 1806 under the MY_TEMP object 1800 registered DDLs list 1802. Also included is the name of the user, date and time the entry was inserted as well as the task name 1808 and the comment that the user chose to include 1810.

The user now enters a commit command:

>EXEC DIFFUSION_API.COMMIT( );

This command will release all commands waiting in the registered command list for execution. The task definition will remain valid (open).

FIG. 19 is another illustration of a repository in accordance with certain embodiments of the present invention, reflecting the changes to the repository following the commit command. The recently executed DDL command is now added to the MY_TEMP object 1900 history list 1902.

Figure 20:
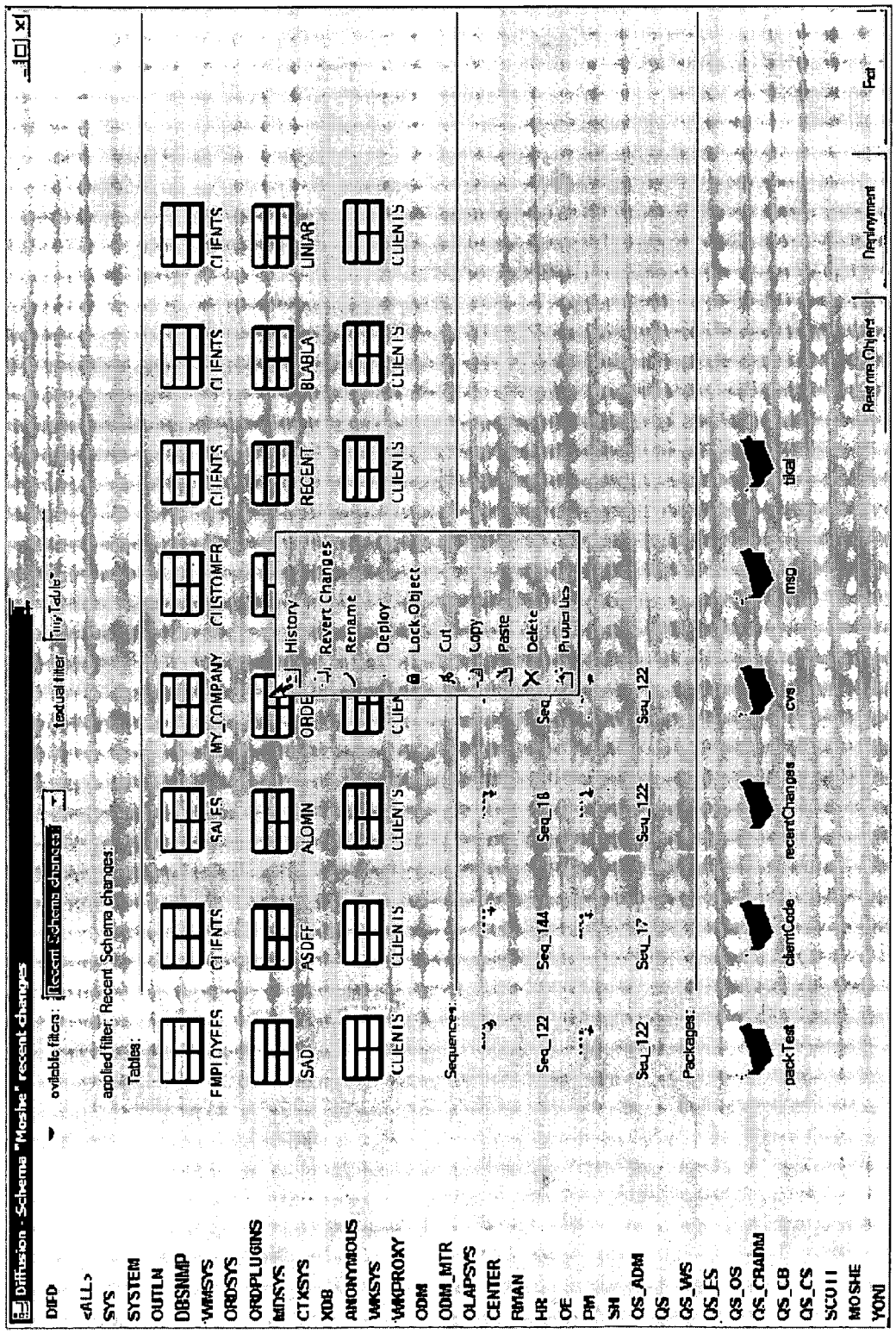
FIG. 20 illustrates an application screen shot according to certain embodiments of the present invention.

FIG. 20 illustrates an application screen shot according to certain embodiments of the present invention.

The screen shows the different schemas on the left, and various database objects on the right.

The objects are arranged by type of object or by object name.

Clicking on an object allows performing operations such as:

"View History"—opens history screen for this object.

"Revert changes"—discards all changes made by this user (clear registered Commands)

"Deploy"—deploy this object to destination schema/database.

"Mark for deployment"—mark single/group of objects

"Delete"—drop object

"Lock object"—lock this object for the current user.

The Screen supports objects' drag & drop; in order to deploy table EMPLOYEE to other schema one should drag the table to the desired schema.

The upper part of the screen allows filtering objects and searching objects by type, name, recent schema changes, etc.

Figure 21:
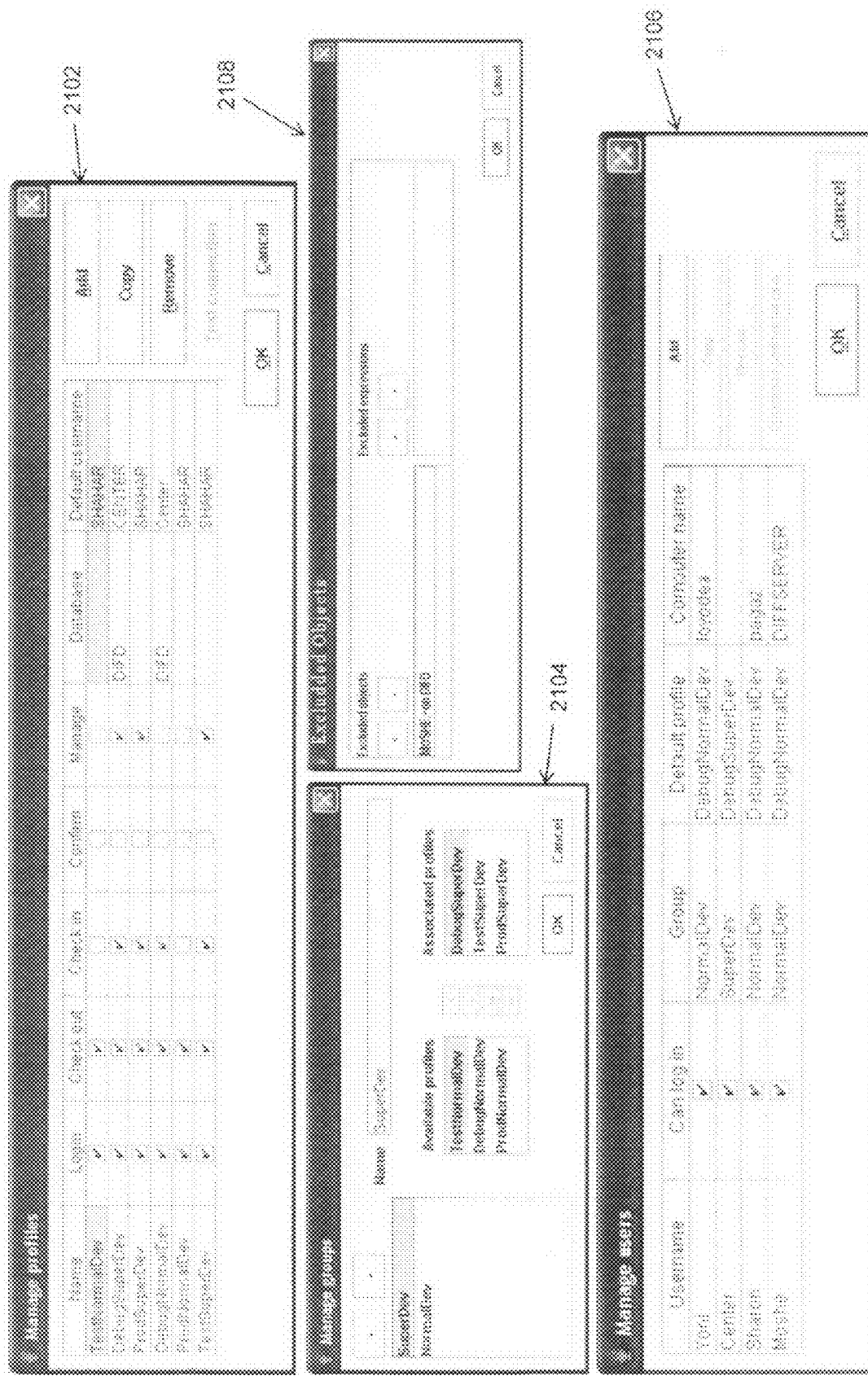
FIG. 21 illustrates additional screen shots according to certain embodiments of the present invention.

FIG. 21 illustrates additional screen shots according to certain embodiments of the present invention.

2102—An admin screen that allows the admin to create and manage profiles. Every profile holds the privileges for a database environment.

2104—An admin screen that allows the admin to create and manage groups of profiles. Each group consists of a number of profiles.

2106—An admin screen that allows the admin to create and manage users. Each user is associated with a group.

2108—An admin screen that allows the admin to define which DDL commands are to be ignored and they will not be added to the history records.

Figure 22:
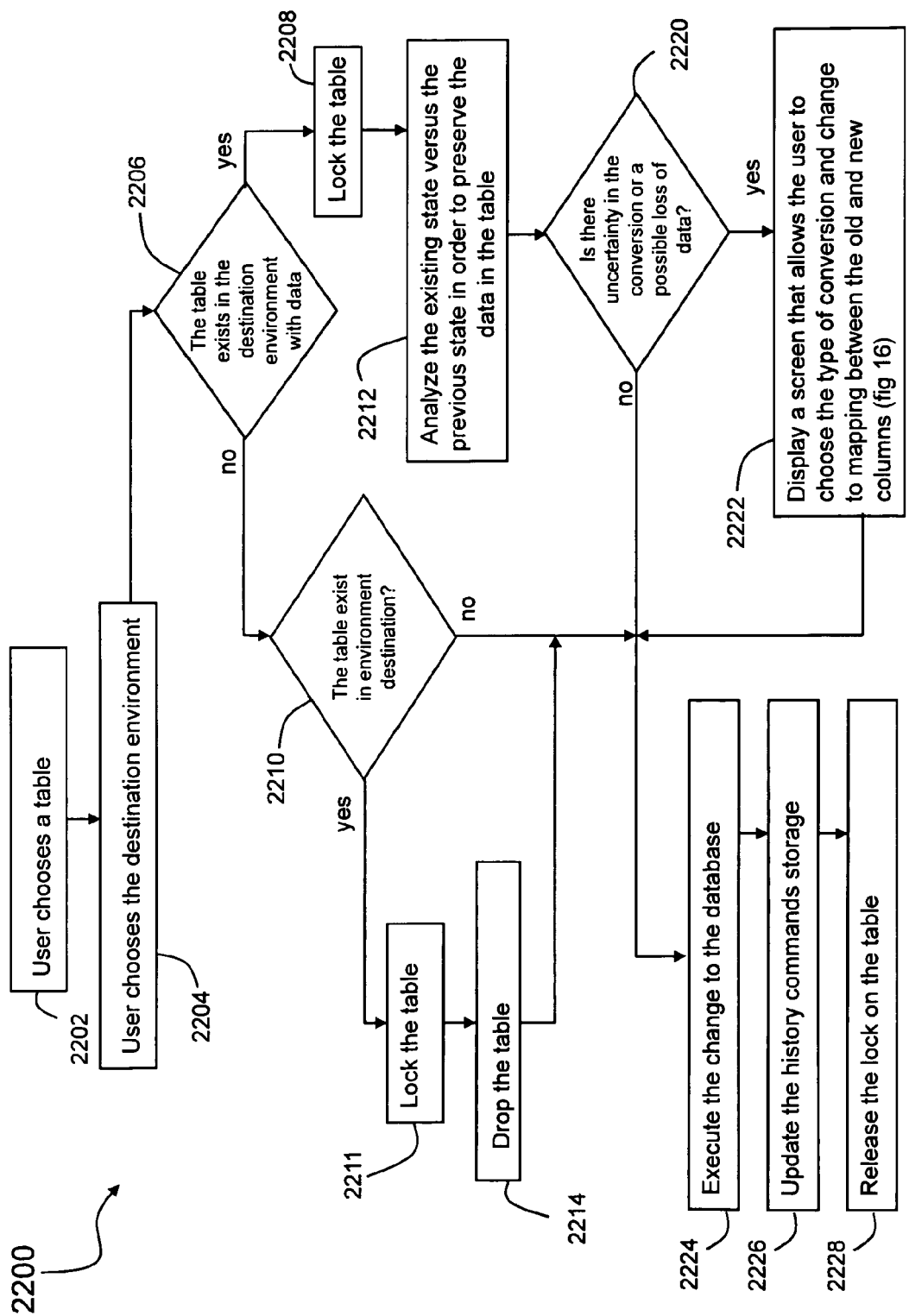
FIG. 22 illustrates a flowchart of a deployment process according to certain embodiments of the present invention.

FIG. 22 illustrates a flowchart of a table deployment process and lock according to certain embodiments of the present invention. In other embodiments of the invention, fewer, more, or different stages than those shown in FIG. 22 may be executed. The stages may be executed in a different order than shown in FIG. 22, and/or in some embodiments one or more stages may be executed simultaneously. Each of the stages of method 2200 may be executed automatically (without user intervention) or semi-automatically.

The deployment process details will allow a DBA/Application developer to easily transfer/copy database objects from one environment to another with the ease of a single button click.

The flowchart describes a deployment process of a table type object, but in accordance with certain embodiments it may refer to other database object types.

The user selects a DB object 2202 and the destination environment to copy the object to 2204. The system checks if same table exists in the destination environment 2206. In case the table exists and contains information, the table will be locked 2208 and the system will search for possible data inconsistency when converting the data from the deployed table and the existing table 2212. Inconsistency may occur, when the existing table contains columns which are not found on the deployed table 2220 or columns with different size or scale compared with the existing table. In accordance with certain embodiments, in case inconsistency is found, the user reviews 2222 the available data conversion option using a designated screen (as explained before, FIG. 16). The system creates the new table and converts the existing data to match the newly created table structure 2224. The system adds a record 2226 to the history table with the user remarks for the current deployment session. The table lock is removed 2228, so other users can manipulate its structure.

In case no data is found for the table 2210, the system marks the table as locked 2211 for the current deployment session, then deletes the table 2214, and creates a new table 2224 using the full creation DDL from the source environment.

The system adds a record 2226 to the history table with the user remarks for the current deployment session and other change information (e.g. date, time, task, change manager etc).

Unless specifically stated otherwise, as apparent from the following discussions, it is appreciated that throughout the specification discussions, utilizing terms such as, "processing", "computing", "selecting", "ranking", "grading", "calculating", "determining", "generating", "associating" or the like, refer to the action and/or processes of a computer or computing system, or processor or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as, processor, computer, apparatus, system, sub-system, module, unit and device (in single or plural form) for performing the operations herein. This may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

With specific reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Features of the present invention which are described in the context of separate embodiments may also be provided in combination in a single embodiment. Conversely, features of the invention which are described for brevity in the context of a single embodiment may be provided separately or in any suitable sub-combination.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A method of managing schema changes made by a user to an object in a database, the method comprising:
    a) intercepting a database command entered by said user;
    b) if said database command is a schema change command referencing said object in said database and a registry criterion is met, then inserting said database command or a command derived therefrom into a registered storage, otherwise releasing said database command to said database for execution thereby;
    c) releasing said database command or a command derived therefrom from said registered storage to said database for execution thereby when a release criterion is met thus giving rise to a released command; and upon obtaining a rollback command, restoring said object in said database to a former version, indicated by said rollback command; wherein said former version is indicated by said rollback command by specifying one of said released command or said command derived therefrom stored in said history storage; wherein said rollback command is of type project rollback command, said method further comprising:
    i) defining an object referenced by the released command specified by the rollback command giving rise to a rollback object;
    ii) defining at least one project associated with said rollback object giving rise to a rollback project;
    iii) defining all objects associated with said rollback project giving rise to project objects;
    iv) defining the execution time of the released command specified by said rollback command giving rise to execution time; and
    v) restoring said project objects to a former version, said version corresponds with said objects' version at said execution time;
    d) inserting said released command or a command derived therefrom into a history storage.

2. The method according to claim 1, wherein said rollback command is of type object rollback command, said method further comprising:
    a) defining an object referenced by the released command specified by said rollback command giving rise to a rollback object;
    b) defining the execution time of the released command specified by said rollback command giving rise to execution time; and
    c) restoring said rollback object to a former version which corresponds to a version of said rollback object at said execution time.

3. The method according to claim 1, wherein said rollback command is of type timestamp rollback command, said method further comprising:
    a) defining the execution time of the released command specified by said rollback command giving rise to execution time; and
    b) restoring all objects in said database to a former version, said version corresponds with said objects' versions at said execution time.

4. The method according to claim 1 wherein said database command is inserted to the registered storage with an associated commit indication giving rise to a commit tagged command, and wherein said database command is released for execution if a release criterion is met; the release criterion includes a commit criterion that is met when a commit command is received indicating a group of commit tagged commands, said group includes at least one of said commit tagged commands to be released for execution in said database.

5. The method according to claim 4, wherein if at least one object that is referenced by said commit tagged commands is locked when said commit command is received then unlocking said object following the release of the commit tagged commands specified by said group of commit tagged commands.

6. The method according to claim 4, wherein said commit command is of type object commit command, specifying at least one database object, whereby all commit tagged commands in said registered storage referencing said at least one object are released to said database for execution thereby.

7. The method according to claim 4, wherein said commit command is of type user commit command, specifying at least one user, whereby all commit tagged commands in said registered storage which were entered by said at least one user are to be released for execution in said database.

8. The method according to claim 4, wherein said commit command is of type task commit command, specifying at least one task, whereby all commit tagged commands in said registered storage which are associated with said task are to be released for execution in said database.

9. The method according to claim 4, wherein said commit command is of type project commit command, specifying at least one project, whereby all commit tagged commands in said registered storage referencing objects that are associated with said project are to be released in said database.

10. The method according to claim 4, wherein if one of the commit tagged commands indicated by said group of commit tagged commands fails to properly execute in said database, then undoing all the commit tagged commands indicated by said group of commit tagged commands which were already executed in said database.

11. The method according to claim 1, wherein said database command is released for execution if a release criterion is met; the release criterion includes a privilege criterion whereby at least one said user is associated with a privilege rule and the privilege criterion is met if said privilege rule indicates that said user is allowed to enter said database command for execution in said database.

12. The method according to claim 1, wherein said database command is released for execution if a release criterion is met; the release criterion includes a conflict criterion that is met if said database command does not cause schema changes to said object that lead to other database commands stored in said registered storage to fail when said other database commands are released to database for execution thereby.

13. The method according to claim 1, wherein said database command is released for execution if a release criterion is met; the release criterion includes a release-lock criterion that is met if said object referenced by said database command is not locked by another user when said database command is released for execution in said database.

14. The method according to claim 1, wherein said database command is inserted to the registered storage with an associated time restriction indication giving rise to a time-tagged command, and wherein said database command is released for execution if a release criterion is met; the release criterion includes a time criterion that is met when a time of release complies with said time restriction indication.

15. The method according to claim 1, wherein said database command is released for execution if a release criterion is met; the release criterion includes a consistency criterion that is met if said database command is consistent with the structure of the said object at the time when said database command is released for execution in said database.

16. The method according to claim 1, wherein said releasing stipulated in (c) further comprises:
    a) obtaining one or more additional database schema change commands from said registered storage, which are referencing said object thus giving rise to merge commands; and
    b) modifying said merge commands within said registered storage to conform with changes introduced by said database command to said object.

17. The method according to claim 1, wherein said registry criterion is at least one selected from a group comprising at least the following criteria: auto-commit criterion, Register-lock criterion.

18. The method according to claim 1, wherein (b) comprises:
    in a case where said database command is a schema change command and the registry criterion is met then:
        if said database object is already locked then notifying said user and rejecting said database object schema change command;
    otherwise:
        (i) locking said database object for said first user; and
        (ii) inserting said command into said registered storage.

19. A method of managing schema changes made by a user to an object in a database, the method comprising:
    a) intercepting a database command entered by said user;
    b) releasing said database command or a command derived therefrom to said database for execution, thereby giving rise to a released command; and upon obtaining a rollback command, restoring at least one of said objects in said database to a former version, indicated by said rollback command; wherein said former version is indicated by said rollback command by specifying one of said released command or said command derived therefrom stored in said history storage; wherein said rollback command is of type project rollback command, said method further comprising:
        i) defining an object referenced by the released command specified by the rollback command giving rise to a rollback object;
        ii) defining at least one project associated with said rollback object giving rise to a rollback project;
        iii) defining all objects associated with said rollback project giving rise to project objects;
        iv) defining the execution time of the released command specified by said rollback command giving rise to execution time; and
        v) restoring said project objects to a former version, said version corresponds with said objects' version at said execution time;
    c) if said database command is a schema change command and a registry criterion is met, then inserting said released command or a command derived therefrom into a history storage.

20. The method according to claim 19, wherein said rollback command is of type object rollback command, said method further comprising:
    a) defining said object referenced by said released command;
    b) restoring only said object to a former version, said version corresponds with said Object's version following said released command original execution time in said database.

21. The method according to claim 19, wherein said rollback command is of type timestamp rollback command, said method further comprising:
    a) restoring all objects in said database to a former version, said version corresponds with said objects' versions at time the released command was originally executed in said database.

22. A system for managing schema changes made by a user to an object in a database, the system comprising:
    a processor and associated storage, said processor and associated storage are configured to perform at least the following:
    a) intercept a database command entered by said user;
    b) if said database command is a schema change command and a registry criterion is met, then insert said database command or a command derived therefrom into a registered storage, otherwise release said database command to said database;
    c) release said database command or a command derived therefrom from said registered storage to said database for execution thereby when a release criterion is met, thus giving rise to a released command; and upon obtaining a rollback command, restore said object in said database to a former version, indicated by said rollback command; wherein said former version is indicated by said rollback command by specifying one of said released command or said command derived therefrom stored in said history storage; wherein said rollback command is of type project rollback command, said system further comprising:
    i) define an object referenced by the released command specified by the rollback command giving rise to a rollback object;
    ii) define at least one project associated with said rollback object giving rise to a rollback project;
    iii) define all objects associated with said rollback project giving rise to project objects;
    iv) define the execution time of the released command specified by said rollback command giving rise to execution time; and
    v) restore said project objects to a former version, said version corresponds with said objects' version at said execution time;
d) insert said released command or a command derived therefrom into a history storage.

23. A system for managing schema changes made by a user to an object in a database, the system comprising:
    a processor and associated storage, said processor and associated storage are configured to perform at least the following:
    a) intercept a database command entered by said user;
    b) release said database command or a command derived therefrom to said database for execution thereby thus giving rise to a released command; upon obtaining a rollback command, restore said object in said database to a former version, indicated by said rollback command; wherein said former version is indicated by said rollback command by specifying one of said released command or said command derived therefrom stored in said history storage; wherein said rollback command is of type project rollback command, said system further comprising:
        i) define an object referenced by the released command specified by the rollback command giving rise to a rollback object;
        ii) define at least one project associated with said rollback object giving rise to a rollback project;
        iii) define all objects associated with said rollback project giving rise to project objects;
        iv) define the execution time of the released command specified by said rollback command giving rise to execution time; and
        v) restore said project objects to a former version, said version corresponds with said objects' version at said execution time;
    c) if said database command is a schema change command and a registry criterion is met, then insert said released command or a command derived therefrom into a history storage.

24. A program storage device readable by machine, tangibly embodying a program of instructions executable by the machine to perform method operations for managing schema changes made by a user to an object in a database comprising:
    a) intercepting a database command entered by said user;
    b) if said database command is a schema change command and a registry criterion is met, then inserting said database command or a command derived therefrom into a registered storage, otherwise releasing said database command to said database;
    c) releasing said database command or a command derived therefrom from said registered storage to said database for execution thereby when a release criterion is met thus giving rise to a released command; and upon obtaining a rollback command, restoring said object in said database to a former version, indicated by said rollback command; wherein said former version is indicated by said rollback command by specifying one of said released command or said command derived therefrom stored in said history storage; wherein said rollback command is of type project rollback command, said method further comprising:
        i) defining an object referenced by the released command specified by the rollback command giving rise to a rollback object;
        ii) defining at least one project associated with said rollback object giving rise to a rollback project;
        iii) defining all objects associated with said rollback project giving rise to project objects;
        iv) defining the execution time of the released command specified by said rollback command giving rise to execution time; and
        v) restoring said project objects to a former version, said version corresponds with said objects' version at said execution time;
    d) inserting said released command or a command derived therefrom into a history storage.

25. A program storage device readable by a machine, tangibly embodying a program of instructions executable by the machine to perform method operations for managing schema changes made by a user to an object in a database comprising:
    a) intercepting a database command entered by said user;
    b) releasing said database command or a command derived therefrom to said database for execution, thereby thus giving rise to a released command; upon obtaining a rollback command, restoring said object in said database to a former version, indicated by said rollback command; wherein said former version is indicated by said rollback command by specifying one of said released command or said command derived therefrom stored in said history storage; wherein said rollback command is of type project rollback command, said method further comprising:
        i) defining an object referenced by the released command specified by the rollback command giving rise to a rollback object;
        ii) defining at least one project associated with said rollback object giving rise to a rollback project;
        iii) defining all objects associated with said rollback project giving rise to project objects;
        iv) defining the execution time of the released command specified by said rollback command giving rise to execution time; and
        v) restoring said project objects to a former version, said version corresponds with said objects' version at said execution time;
    c) if said database command is a schema change command and a registry criterion is met, then inserting said released command or a command derived therefrom into a history storage.

* * * * *